(12) United States Patent
Isenhour et al.

(10) Patent No.: US 10,185,094 B2
(45) Date of Patent: Jan. 22, 2019

(54) OPTICAL PLUG HAVING A REMOVABLE AND REPLACEABLE NOSEPIECE AND A COMPLIMENTARY RECEPTACLE

(71) Applicant: Corning Optical Communications LLC, Hickory, NC (US)

(72) Inventors: Micah Colen Isenhour, Lincolnton, NC (US); James Phillip Luther, Hickory, NC (US); Percil Watkins, Conover, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/938,938

(22) Filed: Nov. 12, 2015

(65) Prior Publication Data
US 2016/0077287 A1    Mar. 17, 2016

Related U.S. Application Data

(63) Continuation of application No. PCT/US2014/037956, filed on May 14, 2014.
(Continued)

(51) Int. Cl.
*G02B 6/38* (2006.01)
*G02B 6/32* (2006.01)
*G02B 6/42* (2006.01)

(52) U.S. Cl.
CPC ............ *G02B 6/3825* (2013.01); *G02B 6/32* (2013.01); *G02B 6/3807* (2013.01); *G02B 6/3817* (2013.01); *G02B 6/3849* (2013.01); *G02B 6/3853* (2013.01); *G02B 6/3866* (2013.01); *G02B 6/3882* (2013.01); *G02B 6/3885* (2013.01); *G02B 6/3886* (2013.01); *G02B 6/428* (2013.01); *G02B 6/4292* (2013.01); *G02B 6/4293* (2013.01)

(58) Field of Classification Search
CPC ................................ G02B 6/38; G02B 6/3825
USPC ............................................................ 385/75
See application file for complete search history.

(56) References Cited

U.S. PATENT DOCUMENTS 4,682,848 A * 7/1987 Cairns .................. G02B 6/3816
                                                                385/69
4,737,008 A * 4/1988 Ohyama .............. G02B 6/3878
                                                                385/88
(Continued)

FOREIGN PATENT DOCUMENTS

EP          0339876         11/1989

OTHER PUBLICATIONS

International Search Report and Written Opinion dated Oct. 9, 2014 for PCT/US2014/037956 Filed May 14, 2014. pp. 1-11.
(Continued)

*Primary Examiner* — Kaveh C Kianni
(74) *Attorney, Agent, or Firm* — Michael E. Carroll, Jr.

(57) ABSTRACT

Disclosed are optical plugs and optical connectors for making optical connections. The optical plugs and optical connectors disclosed have a nosepiece that is easily removed and replaced for allowing access to the optical interface for cleaning and the nosepiece may also protect the optical interface when installed. The nosepiece may be a single component or an assembly as desired. The devices disclosed may be hybrid devices providing both optical and electrical connectivity or they may solely have optical connectivity if desired.

37 Claims, 39 Drawing Sheets

Related U.S. Application Data

(60) Provisional application No. 61/823,985, filed on May 16, 2013.

(56) References Cited

U.S. PATENT DOCUMENTS

| | | | | |
|---|---|---|---|---|
| 4,762,388 | A * | 8/1988 | Tanaka | G02B 6/3831 385/58 |
| 4,944,568 | A * | 7/1990 | Danbach | G02B 6/3847 250/227.11 |
| 5,016,968 | A | 5/1991 | Hammond et al. | |
| 5,037,175 | A * | 8/1991 | Weber | G02B 6/3878 385/76 |
| 5,104,242 | A * | 4/1992 | Ishikawa | G02B 6/4204 385/53 |
| 5,333,225 | A * | 7/1994 | Jacobowitz | G02B 6/4292 333/254 |
| 5,337,388 | A * | 8/1994 | Jacobowitz | G02B 6/3807 385/76 |
| 5,682,451 | A * | 10/1997 | Lee | G02B 6/3812 385/56 |
| 6,086,263 | A * | 7/2000 | Selli | B08B 7/0028 385/33 |
| 6,682,228 | B2 * | 1/2004 | Rathnam | G02B 6/3825 385/55 |
| 7,153,036 | B2 * | 12/2006 | Healy | G02B 6/4292 385/53 |
| 7,180,600 | B2 * | 2/2007 | Horii | A61B 5/0062 356/479 |
| 7,322,752 | B2 * | 1/2008 | Endou | G02B 6/4206 385/88 |
| 7,356,236 | B1 * | 4/2008 | Huang | G02B 6/3807 385/134 |
| 8,879,883 | B2 * | 11/2014 | Parikh et al. | 385/138 |
| 9,063,300 | B2 * | 6/2015 | Torikai | G02B 6/3817 |
| 9,091,822 | B2 * | 7/2015 | DeMerritt | G02B 6/3833 |
| 9,097,862 | B2 * | 8/2015 | Tanaka | G02B 6/3817 |
| 2002/0114589 | A1 * | 8/2002 | Igl | G02B 6/4261 385/88 |
| 2002/0126967 | A1 * | 9/2002 | Panak | G02B 6/4405 385/101 |
| 2003/0063866 | A1 * | 4/2003 | Melton | G02B 6/3825 385/76 |
| 2004/0175073 | A1 * | 9/2004 | Grinderslev | G02B 6/32 385/34 |
| 2006/0045428 | A1 * | 3/2006 | Theuerkorn | G02B 6/3831 385/53 |
| 2006/0239619 | A1 * | 10/2006 | Luther | G02B 6/3821 385/69 |
| 2007/0160327 | A1 * | 7/2007 | Lewallen | G02B 6/3817 385/53 |
| 2007/0258683 | A1 * | 11/2007 | Rolston | G02B 6/4232 385/88 |
| 2008/0273855 | A1 * | 11/2008 | Bradley | G02B 6/3849 385/139 |
| 2009/0028495 | A1 * | 1/2009 | Anrig | G02B 6/3817 385/14 |
| 2009/0257722 | A1 * | 10/2009 | Fisher | G02B 6/3878 385/115 |
| 2010/0027943 | A1 * | 2/2010 | Armani | B01L 3/502715 385/74 |
| 2010/0081303 | A1 * | 4/2010 | Roth | G02B 6/3817 439/140 |
| 2010/0086260 | A1 * | 4/2010 | Parikh | G02B 6/4444 385/76 |
| 2010/0104244 | A1 * | 4/2010 | Grinderslev | G02B 6/3874 385/74 |
| 2010/0302530 | A1 * | 12/2010 | Liu | G02B 6/3861 356/73.1 |
| 2011/0229078 | A1 * | 9/2011 | Isenhour | G02B 6/3817 385/33 |
| 2011/0229090 | A1 | 9/2011 | Isenhour et al. | |
| 2012/0020629 | A1 * | 1/2012 | Shiratori | G02B 6/322 385/93 |
| 2012/0114289 | A1 | 5/2012 | DeMeritt et al. | |
| 2012/0195556 | A1 * | 8/2012 | Wang | G02B 6/3817 385/77 |
| 2013/0022317 | A1 * | 1/2013 | Norris | G02B 6/3865 385/78 |
| 2013/0087690 | A1 | 4/2013 | Sloey et al. | |
| 2013/0089290 | A1 * | 4/2013 | Sloey | G02B 6/3817 385/74 |
| 2014/0112623 | A1 * | 4/2014 | Bradley | G02B 6/4293 385/79 |
| 2014/0157830 | A1 * | 6/2014 | Kawanishi | G02B 6/2555 65/501 |

OTHER PUBLICATIONS

Patent Cooperation Treaty, International Search Report for PCT/US2014/037956, dated Sep. 10, 2014, 4 pages.

* cited by examiner

OPTICAL PLUG HAVING A REMOVABLE AND REPLACEABLE NOSEPIECE AND A COMPLIMENTARY RECEPTACLE

PRIORITY APPLICATIONS

This application is a continuation of International Application No. PCT/US14/37956, filed on May 14, 2014, which claims the benefit of priority to U.S. Application No. 61/823,985, filed on May 16, 2013, both applications being incorporated herein by reference.

FIELD

The disclosure is directed to optical connections for use in electronic devices. More specifically, the disclosure is directed to optical connectors such as optical plug connectors having a removable and replaceable nosepiece for allowing access to the optical interface for cleaning

BACKGROUND

As electronic devices move toward operation at faster data rates the electrical interfaces on these devices along with the electrical transmission cables will reach their bandwidth capacity limitations. Additionally, the electronic devices are trending to smaller and thinner footprints. Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions. Further, these types of devices will require a large number of mating/unmating cycles during their lifetime. Consequently, optical connections for consumer application will need to be easy to clean and maintain by the user.

There is an unresolved need for optical connections that may be used for relatively small devices like typical consumer applications such personnel devices such as smart phones, tablets and other consumer devices that have a relatively small footprint. The concepts disclosed herein solve this unresolved need for optical connections.

SUMMARY

The disclosure is directed to an optical plug connector having an optical portion with an optical interface and a nosepiece that fits about part of the optical portion. The nosepiece is removable and replaceable from the optical portion for accessing the optical interface. The nosepiece may be a single component or an assembly as desired. In one embodiment the plug includes both optical and electrical connectivity, but may only include optical connectivity if desired.

Other embodiments are directed to an optical plug connector having an optical portion with an inner body and an optical body having an optical interface, where the inner body has a passageway for receiving the optical body. The optical plug connector also has a nosepiece that fits about part of the optical portion, wherein the nosepiece is removable and replaceable from the optical portion for accessing the optical interface. The inner housing may be a separate component or may be integrated to another component such as integrally formed with a part of the housing.

The disclosure is also directed to a complimentary receptacle for the optical plug connector. In one embodiment, an optical receptacle includes a shell and a lens body. The lens body has an optical interface with one or more optical channels, wherein the lens body attaches to the shell. The receptacle may include a circuit board assembly attached to the lens body. The circuit board assembly may include one or more active components. Additionally, the circuit board assembly may have a tether with an electrical connection for providing quick attachment of the receptacle to a circuit board of an electronic device.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the embodiments of the disclosure, examples of which are illustrated in the accompanying drawings. Whenever possible, like reference numbers will be used to refer to like components or parts.

The optical connections disclosed herein enable high-speed data applications for transmitting optical signals to electronic devices such as speeds of 5 Gigabits/sec or greater along with having a relatively small and compact footprints so that they are useful for use with electronic devices such as consumer devices and the like. The concepts include an optical plug connector having a removable and replaceable nosepiece and a complimentary optical receptacle that can receive the optical plug connector. The optical receptacle may be a portion of an electronic device so it can receive and transmit optical signals. A removable and replaceable nosepiece means that the nosepiece can be removed from a fully-assembled device such as an optical plug connector and replaced. By way of example, the nosepiece may be removed without disassembly of the device. Further, the concepts of the optical connections may be used in other application such as optical backplanes, switches, routers and other equipment. In order to transmit/receive optical signals, the optical plug connector or optical receptacle may include one or more optical channels for that may include one or more lenses or not as desired. By way of example, the one or more lenses of the optical plug connector such as gradient index (GRIN) lenses are used for collimating or focusing the light from the transmission channel(s) of the plug and are optically coupled to a complementary lenses of the optical receptacle such as molded lenses that direct the optical signal to an active element such as a photodiode or the like. The receive channels of the optical plug connector obtains its signals from an active element such as a laser like a vertical-cavity surface-emitting laser (VCSEL) in communication with the molded lens of the optical receptacle for transmission of the optical signals to the GRIN lens of the optical plug connector when the optical plug connector and optical receptacle are mated together. The optical plug connector and optical receptacle according to the concepts disclosed provide easy connectivity with a footprint that is advantageous for use with electronic devices having thin and compact profiles. Further, the concepts provide a simple optical plug assembly that provides access to an optical interface for easy cleaning for applications that are expected to experience large number of mating/unmating cycles such as consumer electronic applications.

Figure 1:
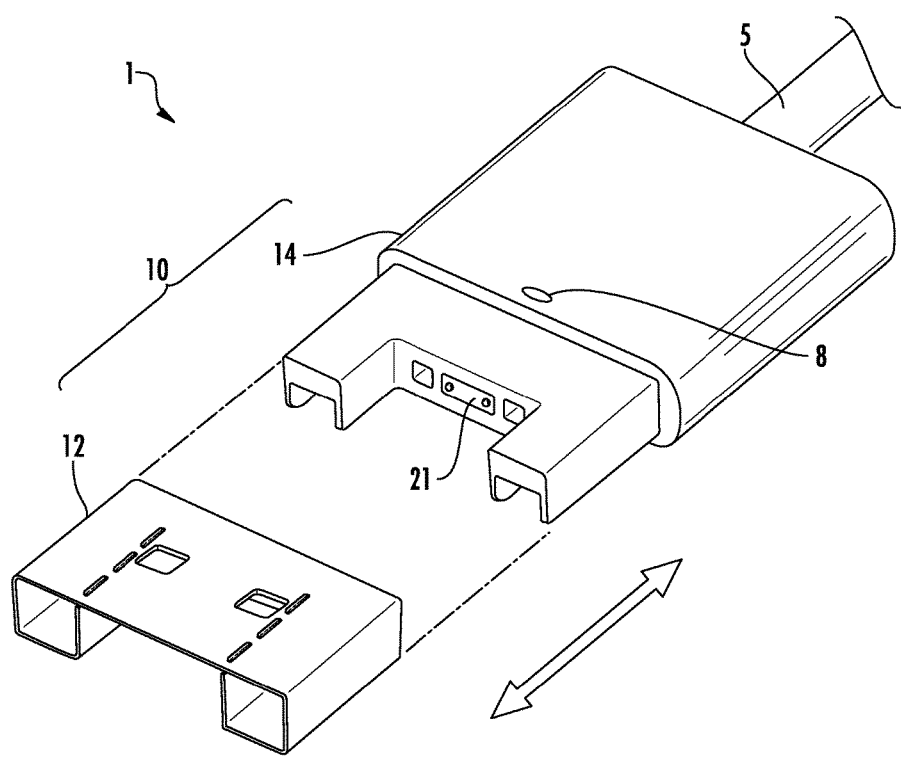
FIG. 1 is a schematic perspective view of a first explanatory optical plug connector having a removable and replaceable nosepiece for accessing an optical interface of the connector.

FIG. 1 is a schematic perspective view of a portion of a cable assembly 1 having a first explanatory optical plug connector 10 (hereinafter "plug") with a nosepiece 12 that fits about part of an optical portion 14 and is removable and replaceable from the optical portion 14 of the optical plug connector 10. The plug 10 is attached to cable 5, thereby forming cable assembly 1. The cable assembly may use any suitable cable 5 attached to the plug. Although, the cable 5 and plug 10 are shown having a straight through alignment for simplicity, the plug may have any suitable angle with respect to the cable such as 45, 60 or 90 degrees, but still other angles are possible. The nosepiece 10 is removable and replaceable from the optical portion 14 of plug 10 as represented by the line with the arrows for accessing an optical interface 21 of the optical portion 14. Consequently, nosepiece 10 may be removed so that the user may have access to inspect, wipe and/or clean the optical interface 21 of the plug 10 as desired, which is advantageous for applications that anticipate a relatively large number of mating/unmating cycles or environments that may be exposed to dirt and debris such as consumer devices. The plug may form a portion of the optical connection that cooperates with an optical receptacle that is a portion of an electronic device such as a tablet, smart phone, display or the like having a complimentary mating geometry. Further, the plug may include a locking feature 8 for securing the nosepiece to the optical portion for inhibiting unintended removal of the nosepiece from the optical portion. The locking feature may be a passive locking feature such as a friction fit and/or protrusion or it may be an active locking feature such as a lever or slide for securing the nosepiece 12 to the optical portion 14. Although, the nosepiece shown in this embodiment is a single component, the concepts may be used with nosepieces arranged as an assembly.

Figure 2:
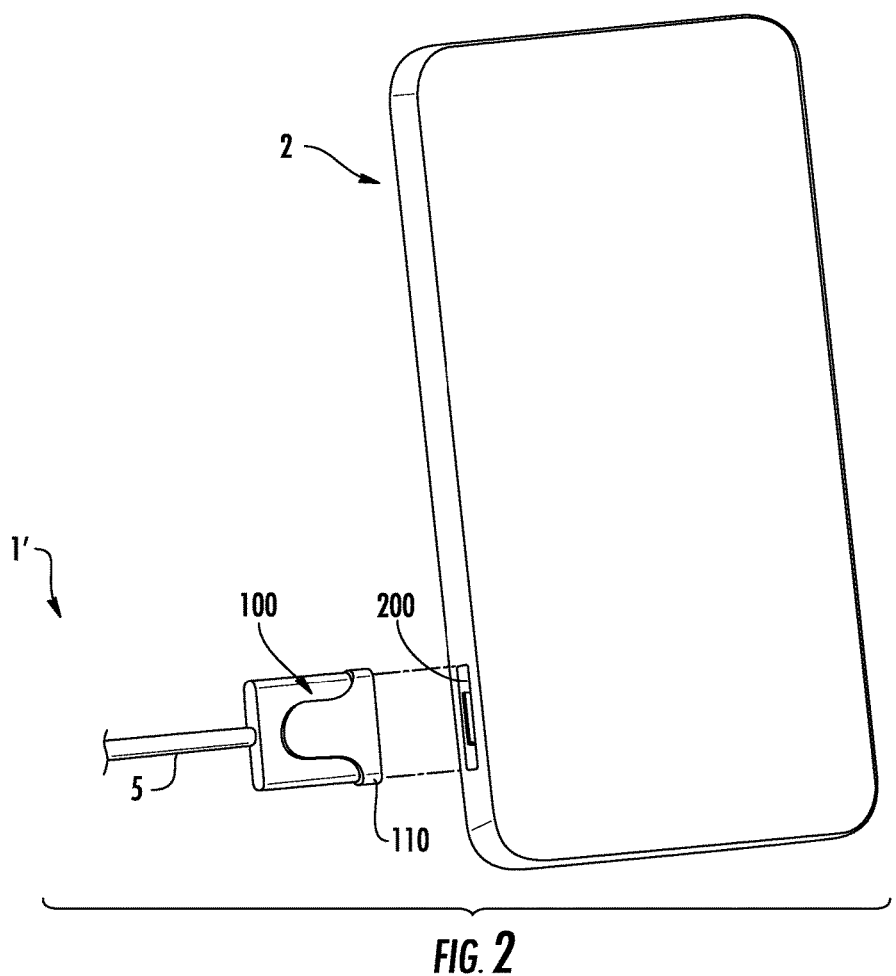
FIGS. 2 and 3 are perspective views of a cable assembly having another explanatory optical plug connector with a removable nosepiece and an electronic device having a complimentary receptacle according the concepts disclosed herein.
Figure 3:
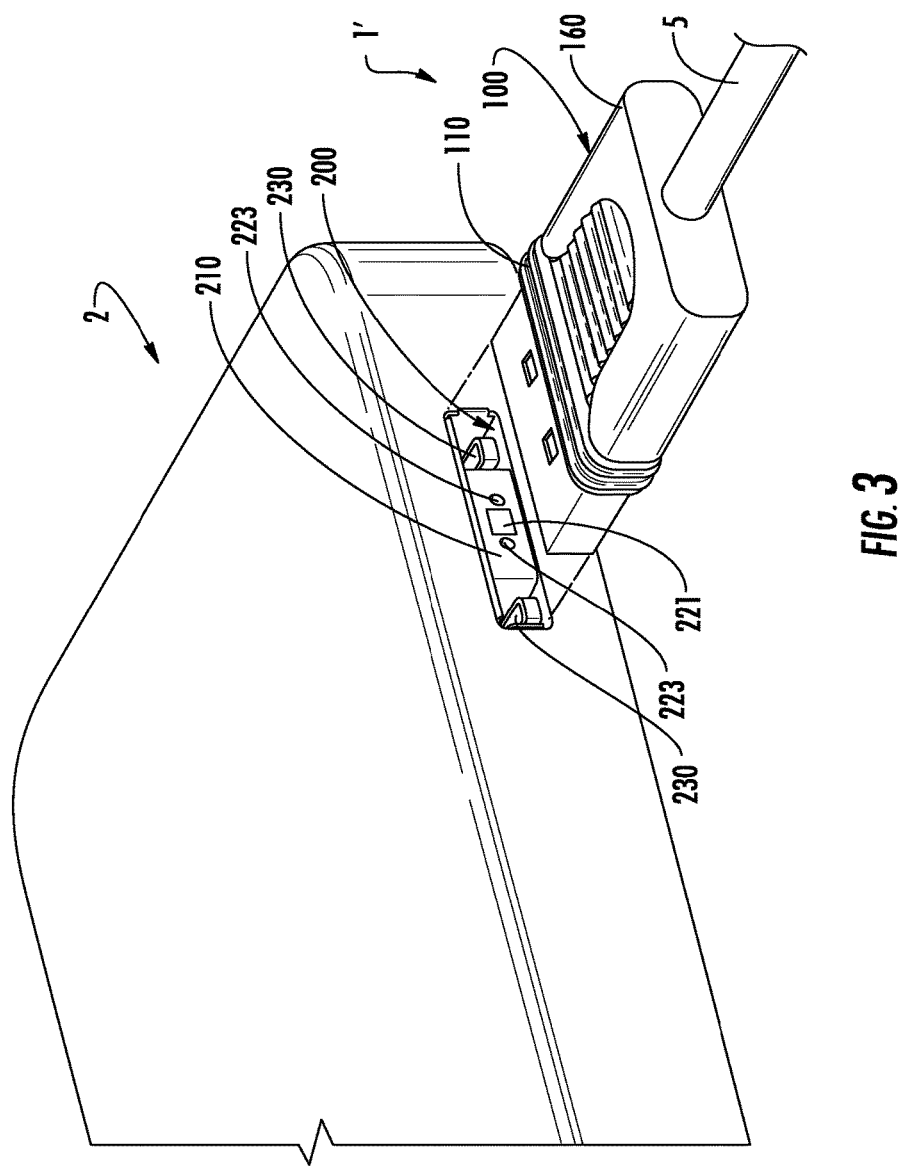
Figure 6:
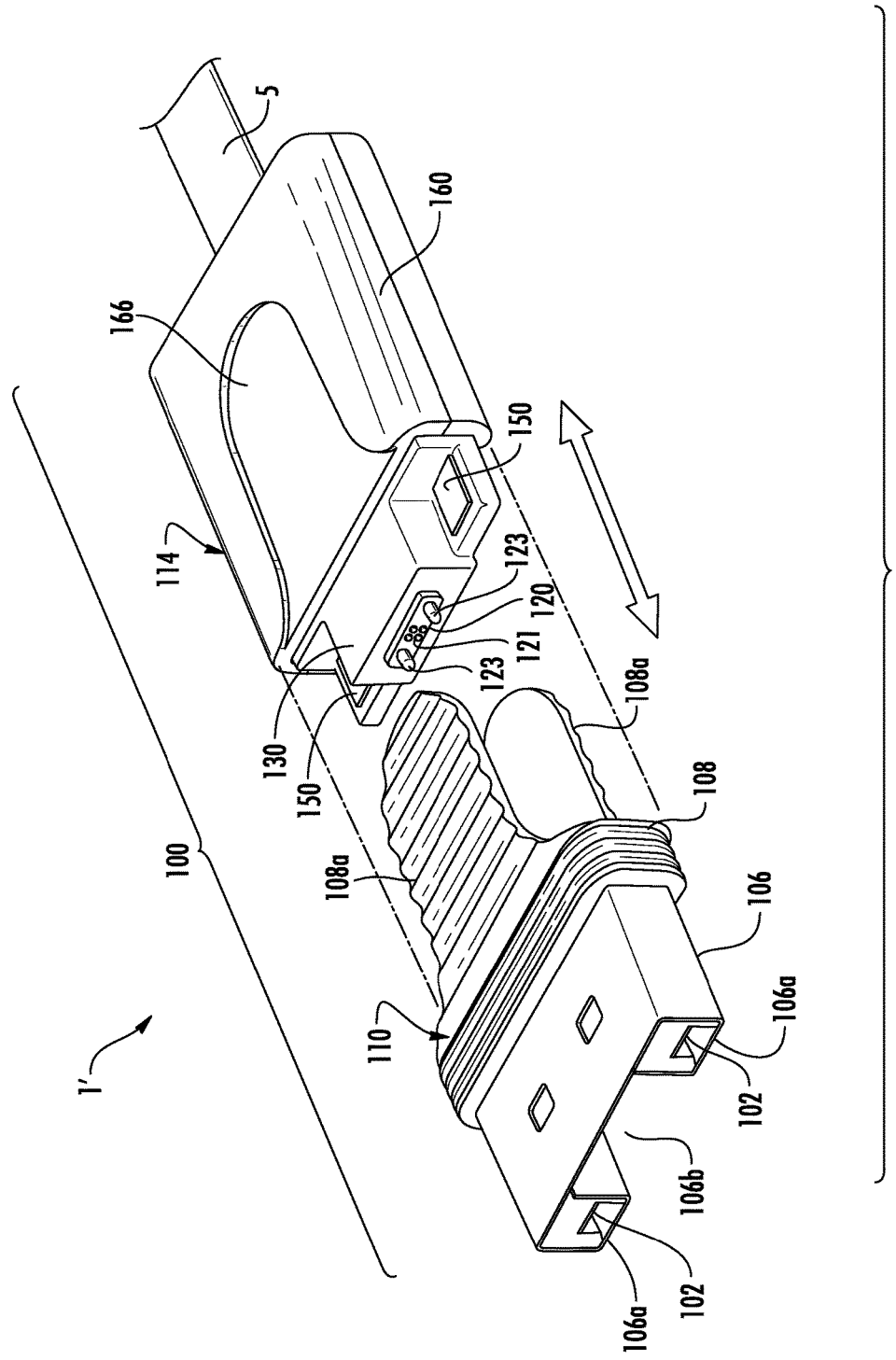
FIGS. 6 and 7 are top and bottom front perspective views of the optical plug connector of the cable assembly of FIG. 2-5 having the nosepiece removed from the optical portion of the optical plug connector for providing access to the optical interface.
Figure 7:
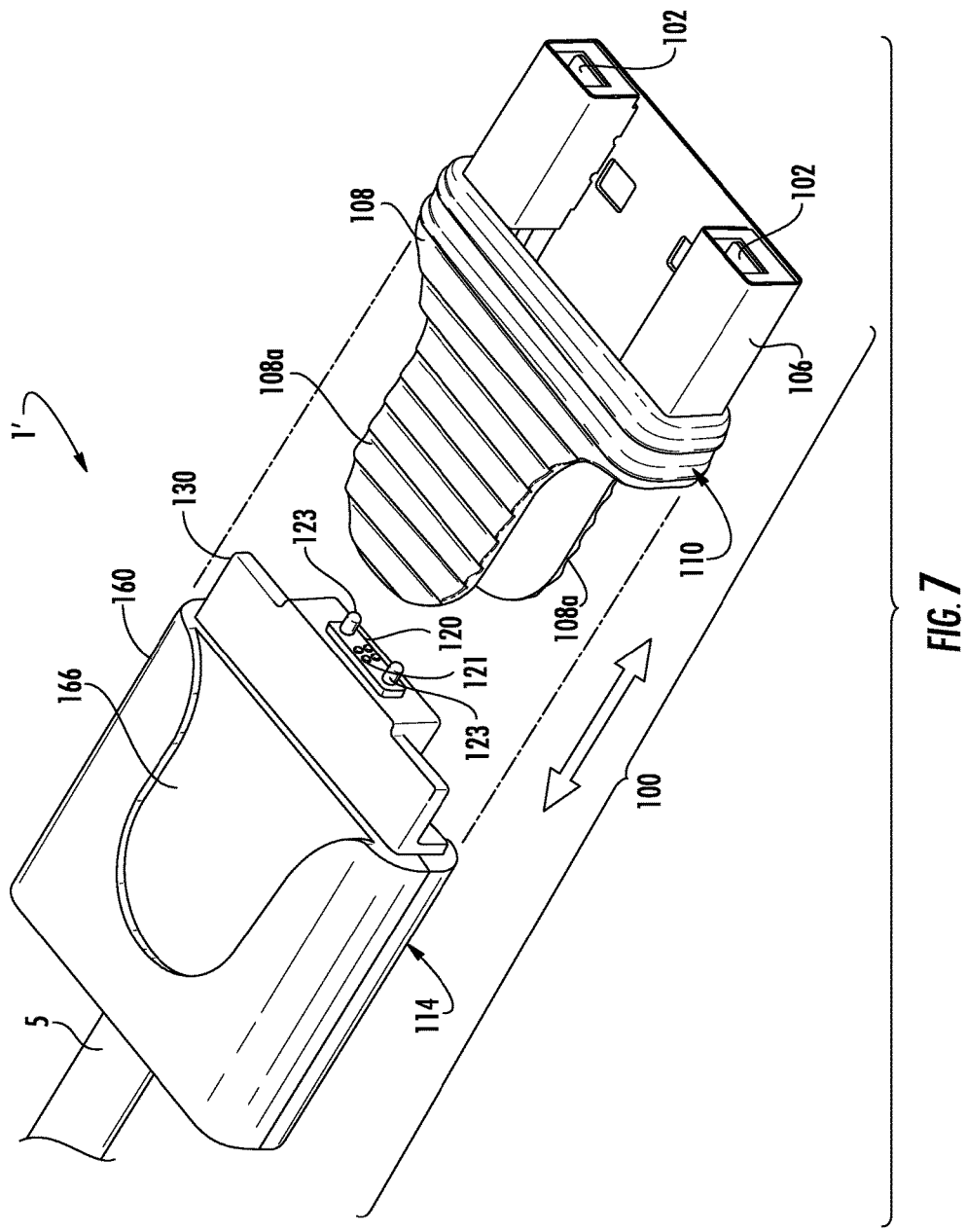
Figure 8:
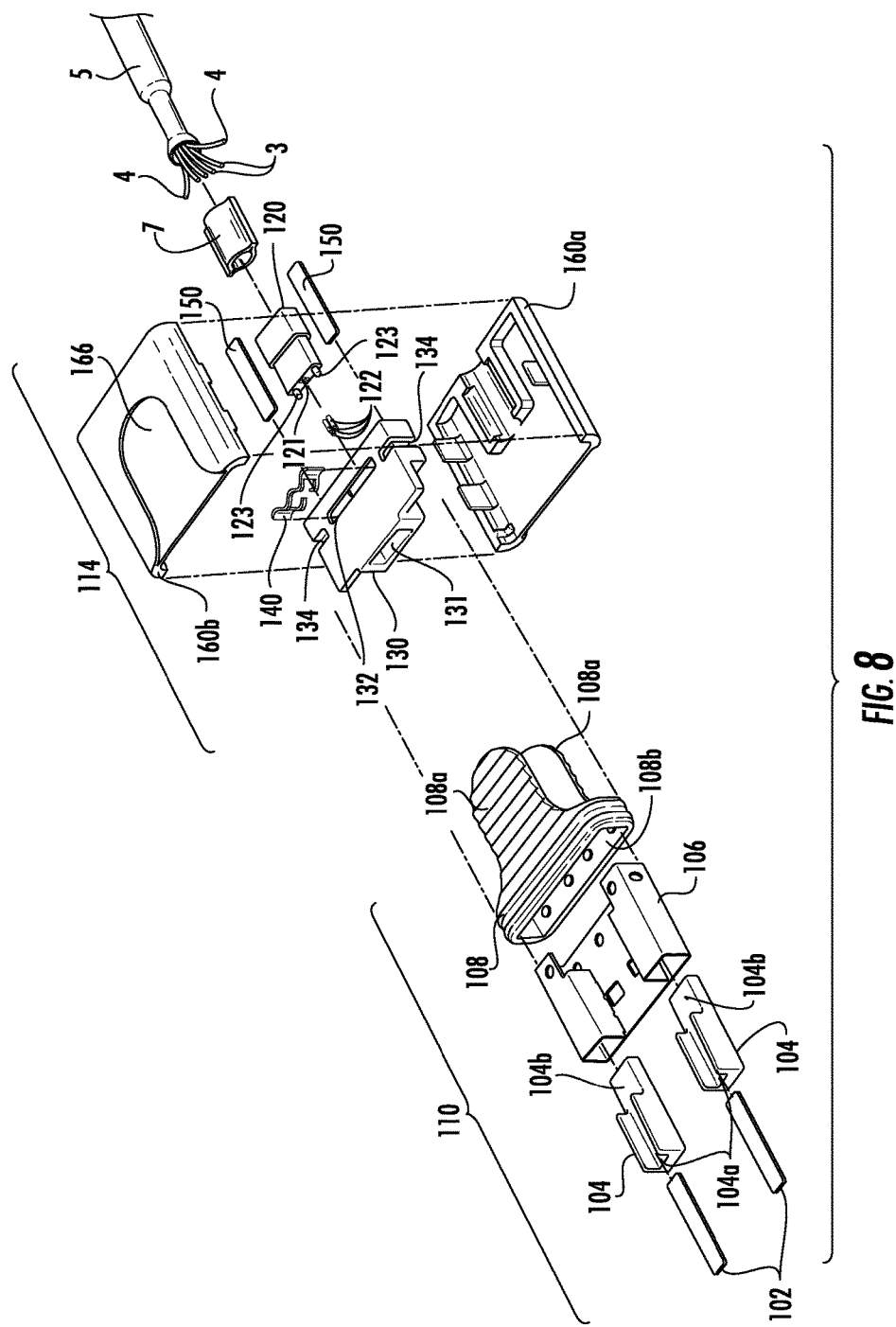
FIG. 8 is an exploded bottom view of the optical plug connector of FIGS. 2-7 showing the nosepiece and optical portion.
Figure 10:
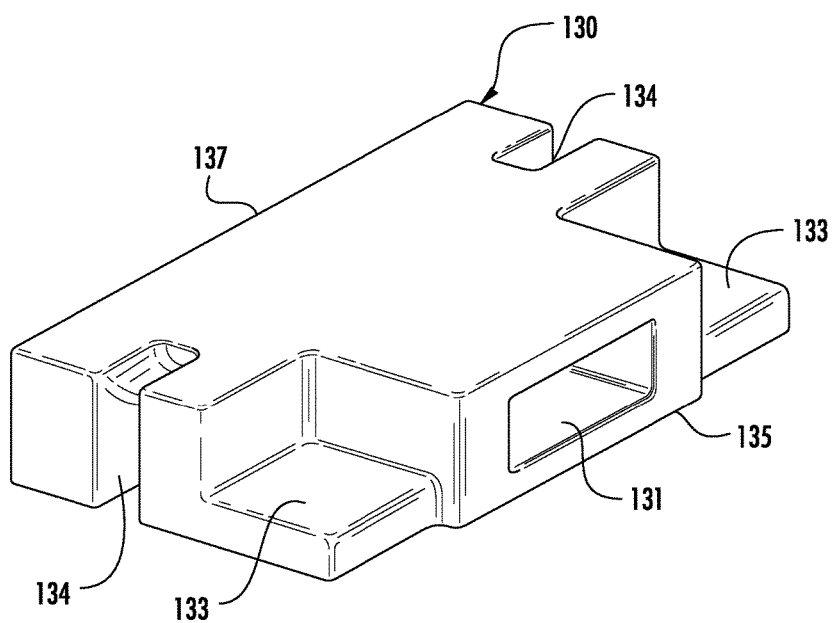
FIG. 10 is a perspective view of the inner body of the optical plug connector of FIG. 7.

The concepts of the plug disclosed herein may also be used with hybrid connections having both optical and electrical connections as desired. In other words, both the plug and receptacle have a complimentary optical and electrical interface. By way of example, FIGS. 2 and 3 are perspective views of a cable assembly 1' having another explanatory optical plug connector 100 (hereinafter "plug") with a nosepiece 110 that fits about part of an optical portion 114 and is removable and replaceable from an optical portion 114 of the plug 100 as represented in FIGS. 6 and 7. Plug 100 is useful for mating with a complimentary optical receptacle 200 (hereinafter "receptacle") of an electronic device 2. Plug 100 is attached to cable 5 that also optionally includes one or more optical fibers 3 and electrical conductors 4, thereby forming cable assembly 1' that may transmit power and/or electrical signals. In this embodiment, the nosepiece 110 is an assembly as discussed herein and as best illustrated in FIGS. 8 and 10.

FIG. 3 shows electronic device 2 having receptacle 200 that includes a lens body 210 having an optical interface 221 with one or more optical channels (not numbered). As shown, the lens body 210 includes at least one alignment feature 223 adjacent to the optical interface 221. Receptacle 200 may also optionally include one or more electrical contacts 230 for transmitting electrical signals or power as desired. In this explanatory embodiment, lens body 210 includes alignment features 223 configured as guide pin bores in the lens body 210 for receiving respective guide pins of the plug for aligning respective optical channels; but other alignment features are possible using the concepts disclosed. For instance, alignment features could be one or more magnetic elements such as magnets and/or ferrous materials or other suitable structure as desired. Alignment features could also be protrusions on the receptacle such as castellations or such for aligning the plug to the receptacle; additionally, features such as the shell and/or electrical interface may also be used for providing course alignment with fine alignment for the optical channels provided by other features.

Figure 4:
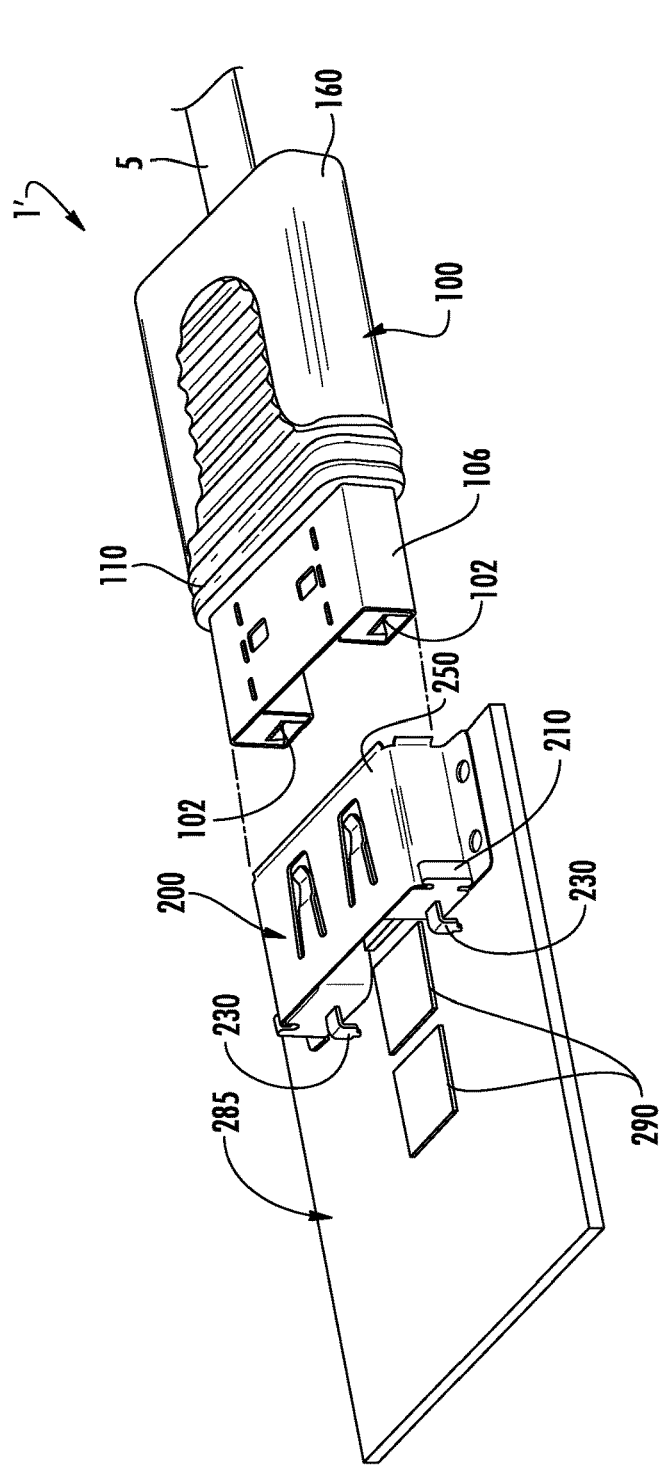
FIGS. 4 and 5 are perspective views of the cable assembly and receptacle of FIGS. 2 and 3 with the receptacle removed from the electronic device.
Figure 5:
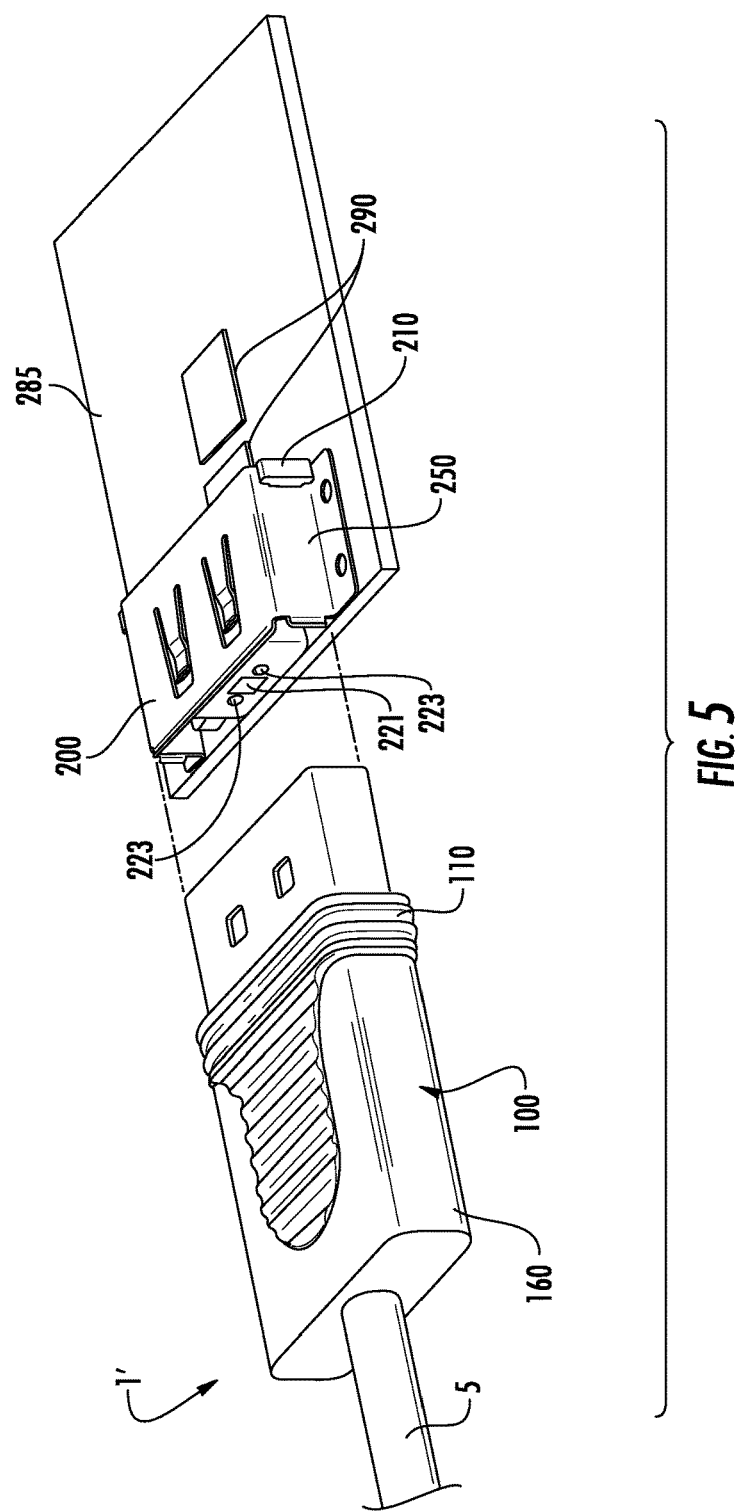

FIGS. 4 and 5 are close-up perspective views showing a portion of the cable assembly 1' with plug 100 aligned with receptacle 200 before being mated. As shown, receptacle 200 is attached to a portion of a circuit board 285, which is removed from the electronic device 2 for illustration purposes. During mating, the plug 100 is oriented with the receptacle 200 so that the nosepiece 110 of plug 100 may be inserted into shell 250 of receptacle 200, thereby allowing optical and electrical connectivity. In other words, the optical interface 121 of the plug 100 is aligned with the optical interface 221 of the receptacle 200 and electrical connections are made between one or more nosepiece electrical contacts 102 of the plug 100 and the one or more electrical contacts 230 of the receptacle 200.

FIGS. 6 and 7 depict a portion of cable assembly 1' with top and bottom front perspective views of plug 100 having the nosepiece 110 removed from the optical portion 114 of plug 10 for providing access to the optical interface 121. As represented by the line with the arrows, the nosepiece 110 fits about part of the optical portion 114 and is removable and replaceable from the optical portion 114. As shown, the nosepiece 110 may optionally include grip 108 that cooperates with a housing 160 of the optical portion 114. In this embodiment, grip 108 includes one or more extensions 108a that extend rearward from the nosepiece 110 and cooperate with the one or more respective recesses 166 of housing 160. Extensions 108a aid in guiding the nosepiece to fit about the optical portion 114 of plug 100. Further, extensions 108a may include a first extension and a second extension have different size/shapes such as different widths that cooperate with different size/shapes such as different widths of first and second recesses 166. Consequently, the plug 100 may be configured so that the nosepiece 110 only fits onto the optical portion 114 in the correct orientation (i.e., one orientation for assembly). The outer surface of a grip 108 may also include a textured surface (not numbered) such as ribs, depression or the like so the user can easily and reliably grab the nosepiece 110 to remove and replace the same from the optical portion 114.

As shown, nosepiece 110 includes one or more nosepiece electrical contacts 102 that are in electrical contact with the electrical contacts 230 on the receptacle 230 when plug 100 is mated to receptacle 200. However, the nosepiece 110 and the optical portion 114 of plug 100 include separate electrical contacts that are electrically disconnected when the nosepiece 110 is removed from optical portion 114 of plug 100. Specifically, nosepiece 110 includes one or more nosepiece electrical contacts 102 for being electrical connected to the one or more optical portion electrical contacts 150 when the nosepiece 114 is attached to the optical portion 114 of plug 110. Thus, the electrical connection from the electrical conductors 4 of cable 5 is continued to the optical portion electrical contacts 150 and then to the nosepiece electrical contacts 102 when the nosepiece 110 is attached to the optical portion 114. In this embodiment, the nosepiece electrical contacts 102 and the optical portion electrical contacts 150 are wiping electrical contacts, but any other suitable electrical contacts are possible such as pin and socket electrical contacts. As depicted, the one or more nosepiece electrical contacts 102 are housed in one or more respective lobes 106a of a shell 106 at a front end of the nosepiece 110. In this embodiment, lobes 106a are arranged as first and second lobes disposed on opposite sides of a pocket 106b of shell 106.

Figure 9:
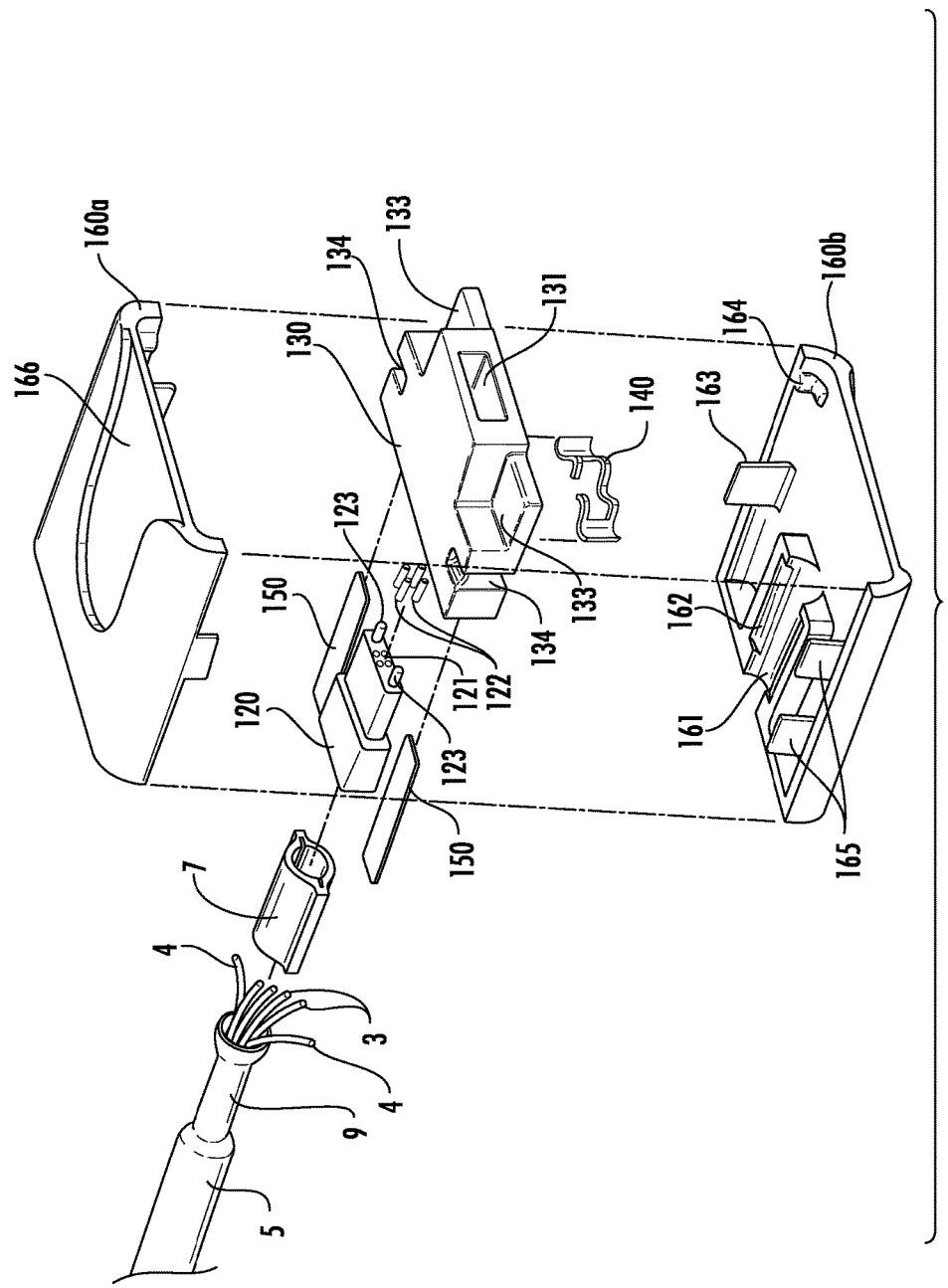
FIG. 9 is an exploded top view of the optical portion of the optical plug connector of FIG. 8.
Figure 12:
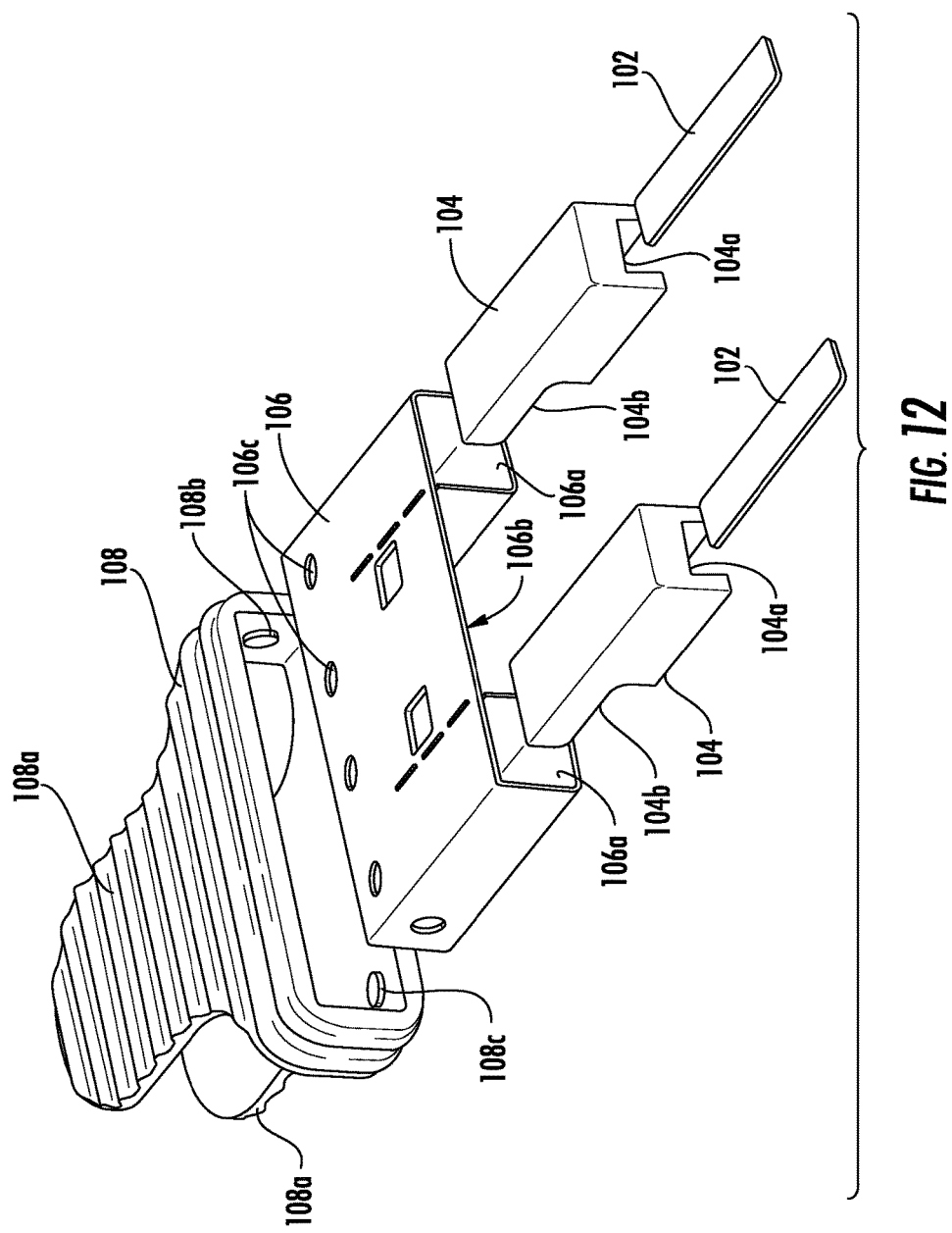
FIG. 12 is an exploded top view of the nosepiece of the optical plug connector of FIG. 8.

FIG. 8 is an exploded bottom view of plug 100 showing details of nosepiece 110 and optical portion 114. FIG. 9 depicts an exploded top view of the optical portion 110 of plug 100 and FIG. 12 is an exploded top view of the nosepiece 110 of plug 100. With continuing reference to FIGS. 8 and 9, optical portion 114 of plug 100 includes optical interface 121 as a portion of optical body 120, an inner body 130, a retainer 140, one or more optical portion electrical contacts 150, and a housing 160. Optical interface 121 may have the optical fibers presented at the interface or include one or more lenses 122 presented at the interface as desired for creating the one or more optical channels of the plug 100. Plugs and receptacles may have any suitable number of optical channels arranged in any desired pattern such as a linear or round array of optical channels. In this plug embodiment, the optical channels are arranged in a 2-by-2 array. Optical body 120 also includes one or more alignment features 123 for registering (i.e., aligning) the optical channels of the optical interface 121 of plug 100 with the complimentary optical channels of receptacle 200. In this embodiment, alignment features 123 are guide pins that are integrally formed (i.e., molded) with optical body 120 and cooperate with alignment features 223 of receptacle 200 when mated together. The alignment features 123 may have other configurations such as being non-round or discrete components as desired. For instance, the alignment features 123 may include one or more magnets such as correlated magnetics having a prearranged pattern of poles (magnetic north and magnetic south regions) for cooperating with a complimentary correlated magnet on the receptacle.

The one or more lenses 122 may be integrally formed in the optical interface 121 or arranged as one or more discrete lenses as desired. For instance, optical body 120 may be formed from an optically transmissive material with lenses integrally formed at the optical interface 121 with bores in optical body 120 leading to the respective lenses so that optical fibers may be received therein. Alternatively, the optical fiber bores 120b of optical body 120 may extend to the front side of the optical body 120 for receiving the one or more lenses 122 therein. By way of example, the discrete lenses may be configured as gradient index (GRIN) lenses that fit into the respective bores of the optical body. Additionally, an index-matching gel may be used between the ends of the respective optical fibers inserted into the optical body 120 and the one or more lenses for aiding optical performance by bridging any gap between the components.

FIG. 10 is a perspective view of the inner body 130 of plug 100. Inner body 130 includes a passageway 131 that extends from a front end 135 to a rear end 137 and is sized for receiving a portion of optical body 120. The optical interface 121 which is a portion of optical body 120 is received in the passageway 131 of inner body 130. The optical interface 121 is accessible at the front end of the inner body 130 when the optical portion 114 is assembled so that when the nosepiece 110 is removed from the optical portion 114 the user has access to the optical interface 121. Optical body 120 may include a stepped portion (not numbered) for limiting the forward travel of the optical body 120 into the passageway 131. After the optical body 120 is inserted into the inner body 130 it any suitable manner. For instance, optical body 120 may be secured by a snap-fit such as resilient members formed either the optical body or the inner body 130. In this embodiment, inner body 130 includes one or more slots 132 for receiving a retainer 140 to secure the optical body 120 in passageway 131. Retainer 140 may be any suitable component such as a clip, spring, washer, pin, etc.; however in this embodiment retainer 140 is a wave spring. Consequently, the optical body 120 is able to move within the passageway 131 of the inner body 130. In other words, the retainer 140 biases the optical body forward and allows the optical body 120 to move a short distance to the rearward during mating as necessary.

Inner body may also include one or more surfaces 133. As shown, surfaces 133 are disposed outward of passageway 131 and provide a support surface for optical portion electrical contacts 150. The optical portion electrical contacts 150 may be attached to inner body 130 in any suitable manner. For instance, inner body 130 may be formed such as molded with the optical portion electrical contacts 150 attached during the molding process. Other variations include using an adhesive or snap-fitting the optical portion electrical contacts 150 to the inner body 130. When assembled, the optical portion electrical contacts 150 are electrically connected to electrical conductors 4 of cable 5. Inner body 130 also includes one or more mounting features 134 such as notches or openings for placing and securing it within the housing 160.

Figure 11:
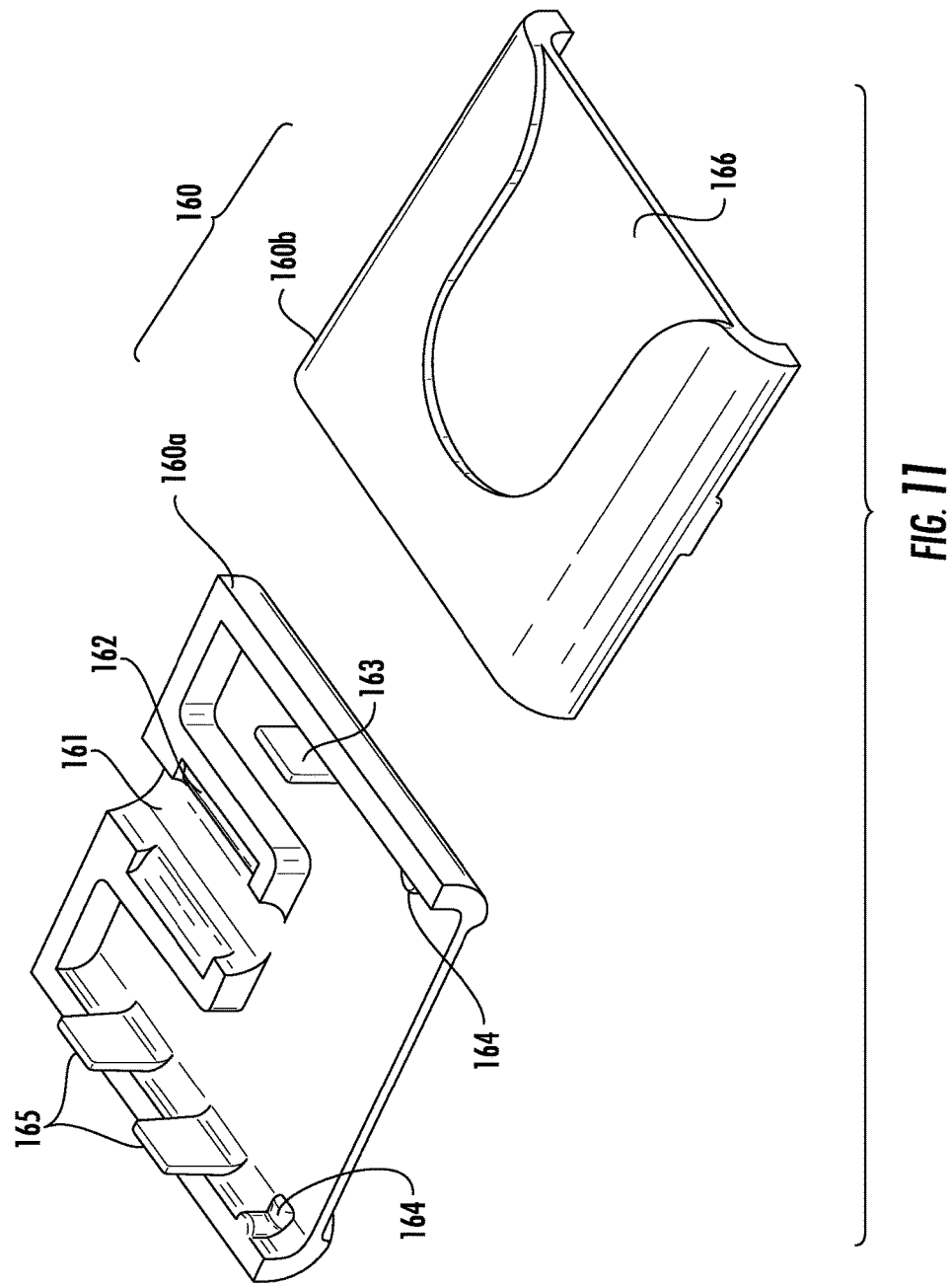
FIG. 11 is a perspective view of the housing of the optical plug connector of FIGS. 2-7.

FIG. 11 is a close-up perspective view of the housing 160 of plug 100. In this embodiment, housing 160 is formed from two similar pieces, namely, a first shell 160a and a second shell 160b that fit together. The first and second shells 160a, 160b include respective openings 161 shaped as a half-pipe for forming a passageway into the housing 160 for the receiving the cable 5. The shells 160a, 160b also include respective cradles 162 for securing the deformed crimp band 7 and respective tabs 163 and 165 that allow the two shells 160a, 160b to snap-fit together.

When assembled, the inner body assembly (not numbered) fits into the housing 160 so that a portion of the inner body 130 extends forward past the housing 160 as best shown in FIG. 6. Specifically, the optical interface 121 and a portion of the optical portion electrical contacts 150 are exposed at the front end of the optical portion 114. Cable 5 is attached to the inner body assembly by first threading crimp band 7 (which is shown in the FIGS. in the deformed state) onto cable 5. Then, the optical fibers 3 of cable 5 are attached to the optical body 120 and electrical conductors 4 attached to the optical portion electrical contacts 150. The crimp band 7 can then be crimped deformed such as shown at the appropriate location on cable 5 such as represented by necked down portion 9 (which represents the shape of the cable after the crimp band 7 is secured thereto) of cable 5 for securing the optical fibers 3 and electrical conductors 4 relative to the cable jacket and inhibit pistoning of the same. If desired, a filling material such as an adhesive, silicone, a sleeve, an insert or the like may be injected or placed into the passageway of the cable for protecting the optical fibers. When assembled, the deformed crimp band 7 is placed into cradle 162 of housing 160 for providing strain relief for the cable assembly and the mounting features 134 of the inner body 130 are received by the guide features 164 of the first and second shells 160a, 160b of housing 160. Thereafter, the first and second shells 160a, 160b of housing 160 can be assembled about the inner body assembly.

Figure 13:
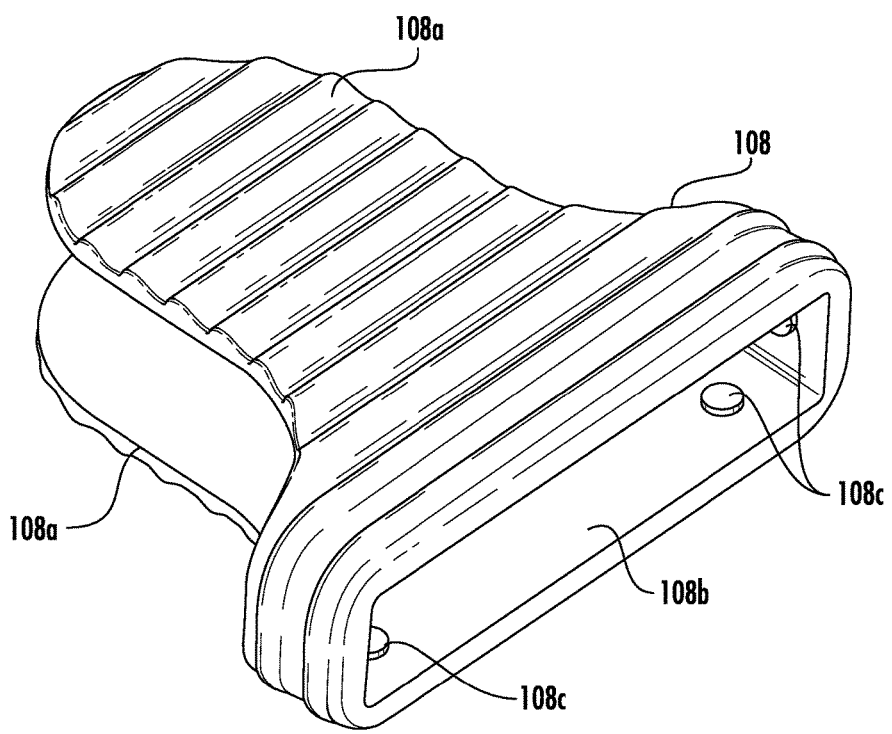
FIG. 13 is a perspective view of the grip of the nosepiece of the optical plug connector of FIG. 12.

As best depicted in FIG. 12, nosepiece 110 is an assembly having one or more nosepiece electrical contacts 102, one or more rails 104, shell 106 and grip 108. When assembled, nosepiece electrical contacts 102 fit into respective guides 104a of the rail 104 to form a rail assembly. The rail assembly that includes the rail and the electrical contact fit into and attach to a respective lobe 106a of shell 106. In this embodiment, the rails 104 are generally flush with the front end of shell 106, but other arrangements are possible. The rail(s) 104 may be attached to the lobes 106a of shell 106 in any suitable manner such as with tabs, protrusions, adhesive, or a friction fit. In this embodiment, the nosepiece 110 includes first and second rails 104 each having a respective nosepiece electrical contact 102 that are attached to the respective guides 104a. As best shown in FIG. 8, the rails 104 have a cutout 104b at the rear that includes a planar surface for providing access to nosepiece electrical contacts 102 so that they can electrically connect to optical portion electrical contacts 150 when the nosepiece 110 is attached to the optical portion 114. As depicted, the lobes 106a of shell 106 are disposed on opposite sides of a pocket 106b. Pocket 106b allows the shell 106 and nosepiece 110 to fit about inner body 130 when the nosepiece 110 is attached to the optical portion 114. FIG. 13 is a perspective view of grip 108 of the nosepiece 110 showing a passageway 108b along with retention features 108c disposed in the passageway. Retention features 108c are configured as a plurality of protrusions that cooperate with complimentary retention features 106c located on shell 106. Retention features 106c are configured as openings, but other methods are possible. By way of example, grip 108 may be molded about shell 106 or an adhesive may be used for securing the same, instead of a snap-fit. When assembled, a portion of shell 106 extends beyond the grip 108 so that it can engage the receptacle 200.

Figure 14:
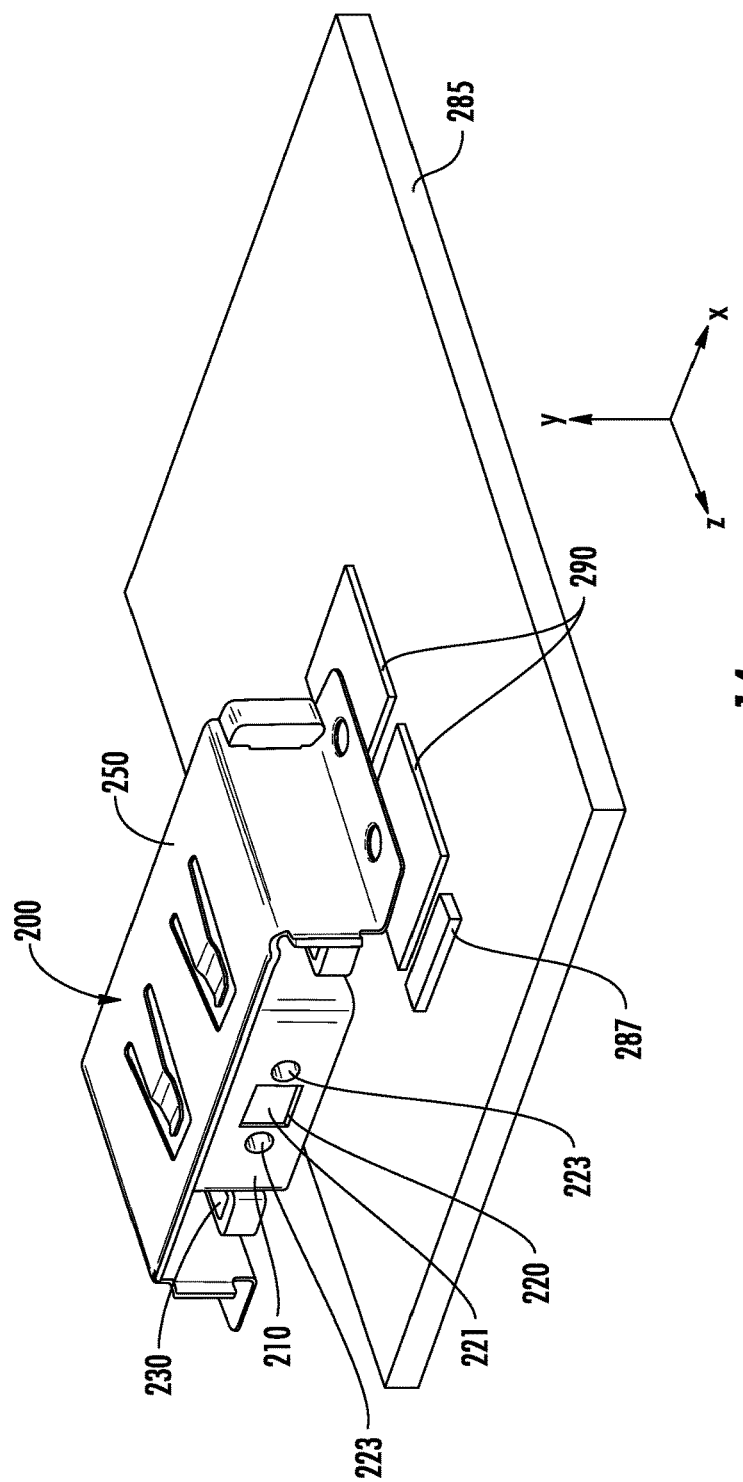
FIG. 14 is a view of the explanatory receptacle of FIGS. 4 and 5 with the receptacle separated from the circuit board.
Figure 15:
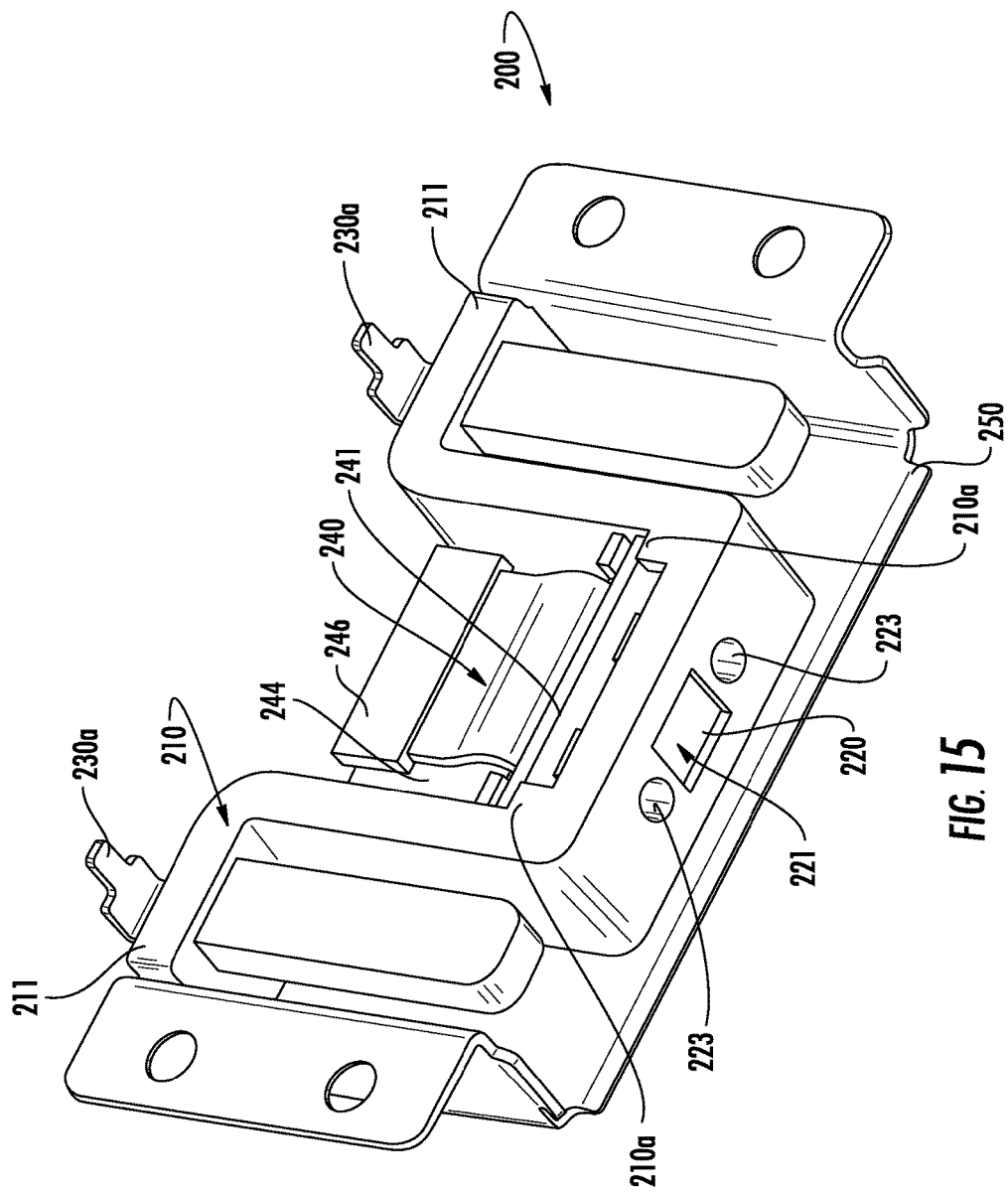
FIG. 15 is a bottom front perspective view of the receptacle removed from the circuit board.
Figure 16:
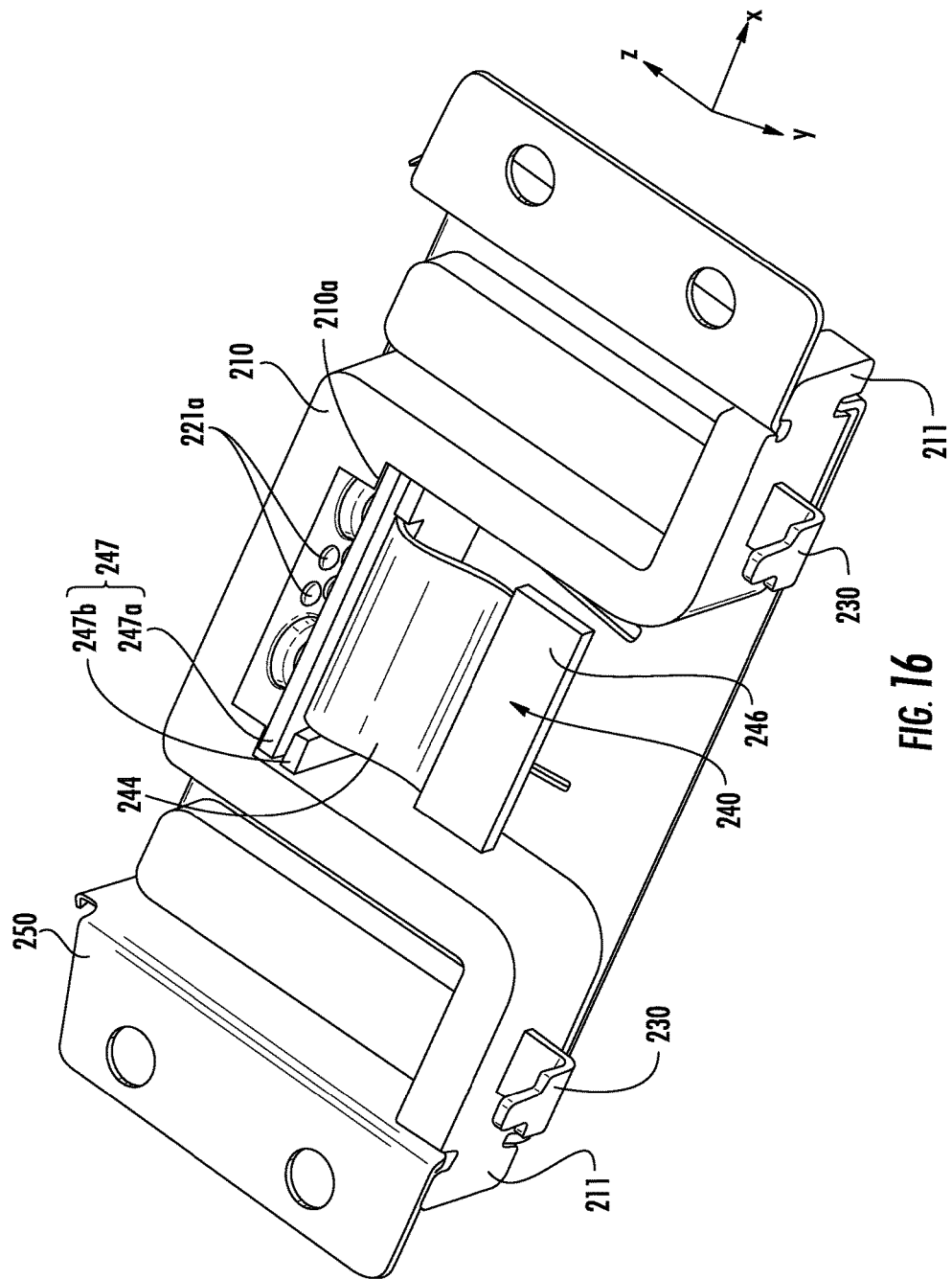
FIG. 16 is a bottom rear perspective view of the receptacle removed from the circuit board.

FIG. 14 is a view of the explanatory receptacle 200 with it separated from the circuit board 285 and FIGS. 15 and 16 respectively are a bottom front and bottom rear perspective views of the receptacle 200 removed from the circuit board 285 of the electronic device. As shown, circuit board 285 includes an electrical interface 287 and one or more integrated circuits 290 for processing signals along with other components as desired for the electronic device (other structure and components on the circuit board are removed for clarity purposes). As shown in FIGS. 15 and 16, receptacle 200 may include a receptacle circuit board assembly 240 attached to the lens body 210. When the electronic device is assembled, the receptacle circuit board assembly 240 is electrically attached to circuit board 285 for communicating signals between the receptacle 200 and the circuit board 285. For instance, receptacle 200 is configured with a flexible tether having pluggable electrical attachment to circuit board 285. Specifically, circuit board 285 includes an electrical connector 287 for cooperating with a complementary electrical connector 246 of the receptacle circuit board assembly 240 for easily making the appropriate electrical connections between the circuit board 285 and the receptacle circuit board assembly 240. Of course, other electrical connectivity may be used with the concepts disclosed.

Receptacle circuit board assembly 240 is used for converting the optical signals to electrical signals and vice versa and may have any suitable arrangement or layout. Receptacle circuit board assembly 240 includes at least one active component 241 aligned with at least one optical channel of the optical body when properly aligned and attached to lens body 210. As shown, receptacle circuit board assembly is attached to the lens body 210 and spaced at a suitable distance from the lenses using ledges 210a, which provide the desired z-direction distance between the active component 241 and the lens body 210. The receptacle circuit board assembly 240 may use a passive and/or active alignment for positioning the receptacle circuit board assembly 240 in the X-direction and Y-direction. Active component 241 is an electro-optical component used for transmitting or receiving optical signals to/from the optical channels of the lens body 210. By way of example, active component 241 is a photodiode or other similar device for receiving optical signals or a vertical-cavity surface-emitting laser (VCSEL) for transmitting optical signals, thereby providing one or more transmit and receive channels. Additionally, receptacle circuit board assembly 240 may include further electronic components TIAs or laser drivers arranged as a first circuit portion 243 and/or a second circuit portion 245 for processing signals and other electronics such as integrated circuits (ICs) like clock and data recovery (CDR), laser drivers serializer/deserializer (SerDes), and the like on the circuit board 285.

FIG. 16 is a perspective bottom rear view of receptacle 200 showing the receptacle circuit board assembly 240 operably attached to the lens body 210 so that at least one active component 241 is aligned with the at least one optical channel such as lens 221a. In this embodiment, the receptacle circuit board assembly 240 includes a circuit board 247 having electronics such as the active components 241 and other circuitry such as first circuit portion 243 mounted thereon. The active components 241 of receptacle circuit board assembly 240 aligned with the at least one optical channel of lens body 210 when attached to the lens body 210. In this embodiment, circuit board 247 of receptacle circuit board assembly 240 is operably attached to the ledge(s) 210a at the rear side of the lens body 210. In this instance, an adhesive is used for securing circuit board 247 to ledge(s) 210a, but any suitable attachment method is possible. In this embodiment, the optical channels include respective lenses 221a at the rear side of the optical body 210 for focusing or collimating the optical signals to/from the active components 243. "Operably attached" means that the active components 243 of the receptacle circuit board assembly 240 are properly spaced from the optical channels of the lens body (z-direction) such as the lenses of the optical body 210 for maintaining the desired distance between the active components 243 and the optical channels and suitable aligned in the x-direction and y-direction for providing the desired level of optical coupling.

Further, receptacle circuit board assembly 240 may use a flexible substrate 244 for making electrical connections between the circuit board 247 having a first circuit portion 243 and/or a second circuit portion 245 and the circuit board 285 of the electronic device. In other words, the flexible substrate 244 allows an electrical turn so that the first and second circuit portions 243,245 of the circuit having the active components (e.g., photodiodes and VCSELs), transimpedence amplifier (TIA), and the laser drivers are electrically connected to the other integrated circuits on the circuit board 285. In this embodiment, circuit board 247 is formed from a first portion 247a and a second portion 247b and sandwich part of the flexible substrate 244 between the first portion 247a and the second portion 247b. Specifically, the electrical connection between the electrical conductors of the flexible substrate 244 and the electrical components on circuit board 247 are made between the first and second portions 247a, 247b of circuit board 247.

Splitting the electronics between the receptacle circuit board assembly 240 that is attached to the lens body 210 and other components on the circuit board 285 such as the clock and data recovery (CDR) IC and Serdes IC allow for smaller receptacle footprints and keep the specific electrical traces to/from the active components 243 such as the TIA or laser drive to short lengths such as 200 microns or less and the electrical traces may even be about 100 microns or less. Specifically, the flexible substrate 244 provides an electrical turn with flex coupling between the receptacle circuit board assembly 240 and circuit board 285, thereby allowing relatively small form-factors for the optical connector since the CDR and Serdes IC's are relatively large and are located on another circuit portion such as the electronic device circuit board that can be orientated in different manner such as a horizontal plane where there is more space available.

Receptacle circuit board assembly 240 may also include other advantageous arrangements when having optical connectors with more than one transmit and one receive channel. For instance, the receptacle circuit board assembly 240 may use separate TIAs and/or laser drivers on the first circuit portion 243 and the second circuit portion 245 of the receptacle circuit board assembly 240 (i.e., several TIAs or laser drivers for different optical channels). By way of example, receptacle 200 has multiple optical channels arranged in a 2×2 array. Consequently, the first circuit portion 243 with the TIAs and laser drivers can now be split (i.e., multiple TIAs and laser drivers) with a dedicated TIA and laser driver placed onto each side of the plurality of optical channels that are arranged in an two-by-two array. In this embodiment, receptacle circuit board assembly 240 uses multiple TIA/laser driver arrangement (i.e., one TIA/laser driver for each side of the 2×2 array; one TIA/laser driver for the left side 243 and one TIA/laser driver for the right side 245) for enabling a relatively small height H for the receptacle 200, thereby allowing use of the optical connector in thin devices such as smart phones, tablets and the like.

Further, placing electrical components such as the TIA and laser drivers relatively close to the active components such as photodiodes and VCSELs allows relatively short wire bond lengths such as 100 microns or shorter for supporting high-speed data transfer rates such as 10 Gb/sec or more and even up to 20 Gb/sec and higher.

Figure 17:
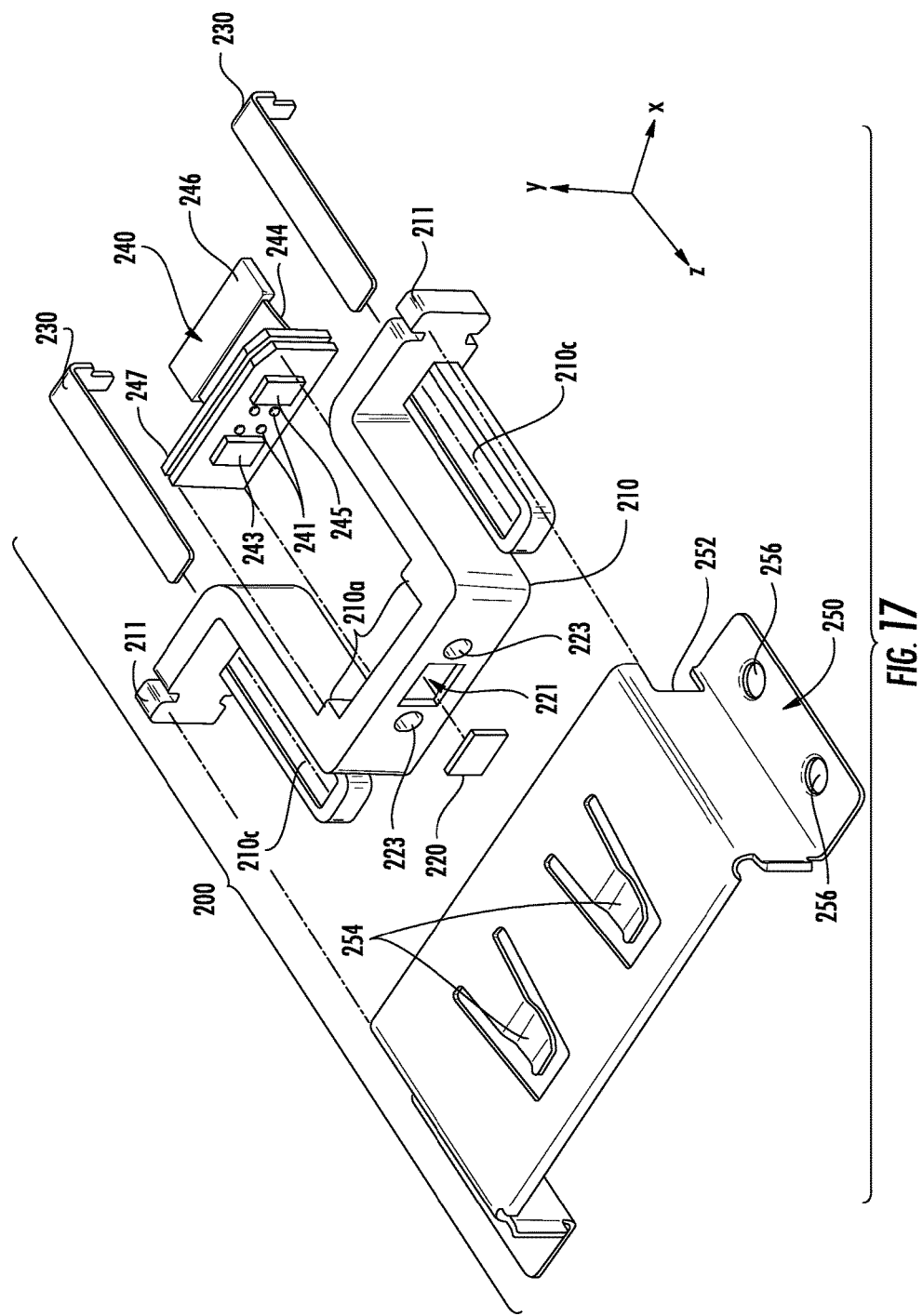
FIGS. 17 and 18 are a partially exploded perspective views respectively from the front and rear side of the receptacle.
Figure 18:
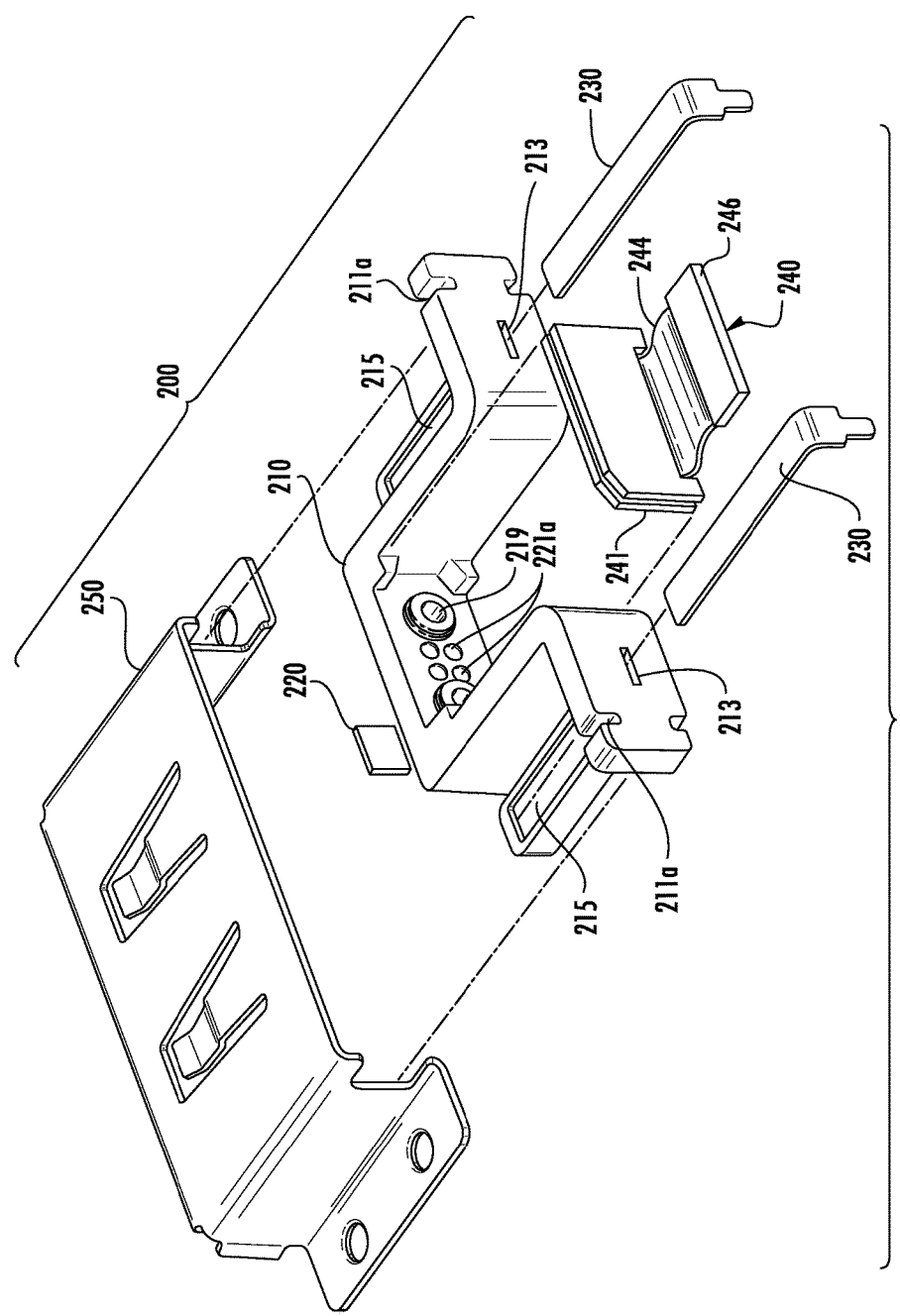

FIGS. 17 and 18 are partially exploded perspective views from the front and rear side of the receptacle 200, respectively. As shown, receptacle 200 includes lens body 210 having an optical interface 221 with one or more optical channels and a shell 250. When assembled, the lens body 210 attaches to shell 250. The lens body 210 may have an optional cover 220 attached thereto for protecting the optical interface 221. In other words, the cover 220 may cover the lenses that form the optical channels. Cover 220 may be formed from any suitable material such as glass or a polymer. For instance, the glass cover may be made from a chemically strengthened glass. The cover 220 may further include a coating such as an anti-reflective (AR) coating or a scratch-resistant coating.

In this embodiment, lens body 210 has a portion with a U-shape, but the lens body may have other suitable shapes or configurations. As shown, the lens body 210 has one or more attachment flanges 211 for attaching it to shell 250 that generally extend from the U-shaped portion. As shown, the attachment flanges 211 may include one or more notches 211a for allowing a friction-fit or snap-fit with one or more respective cut-outs 252 of shell 250. Receptacle 200 also includes one or more electrical contacts 230 and lens body 210 includes one or more rails 210c formed therein. Rails 210c are used as a support surfaces for the respective electrical contacts 230. Electrical contacts 230 may be integrally molded into the lens body 210 or be configured to slide into a respective slot 213 from a rear end of the lens body 210. As depicted, electrical contacts 230 have a generally planar surface for electrical connection to the electrical contacts 102 of the nosepiece 110. The other end of electrical contacts 230 have a bend with a lead (not numbered) for making an electrical connection with circuit board 285.

Figure 19:
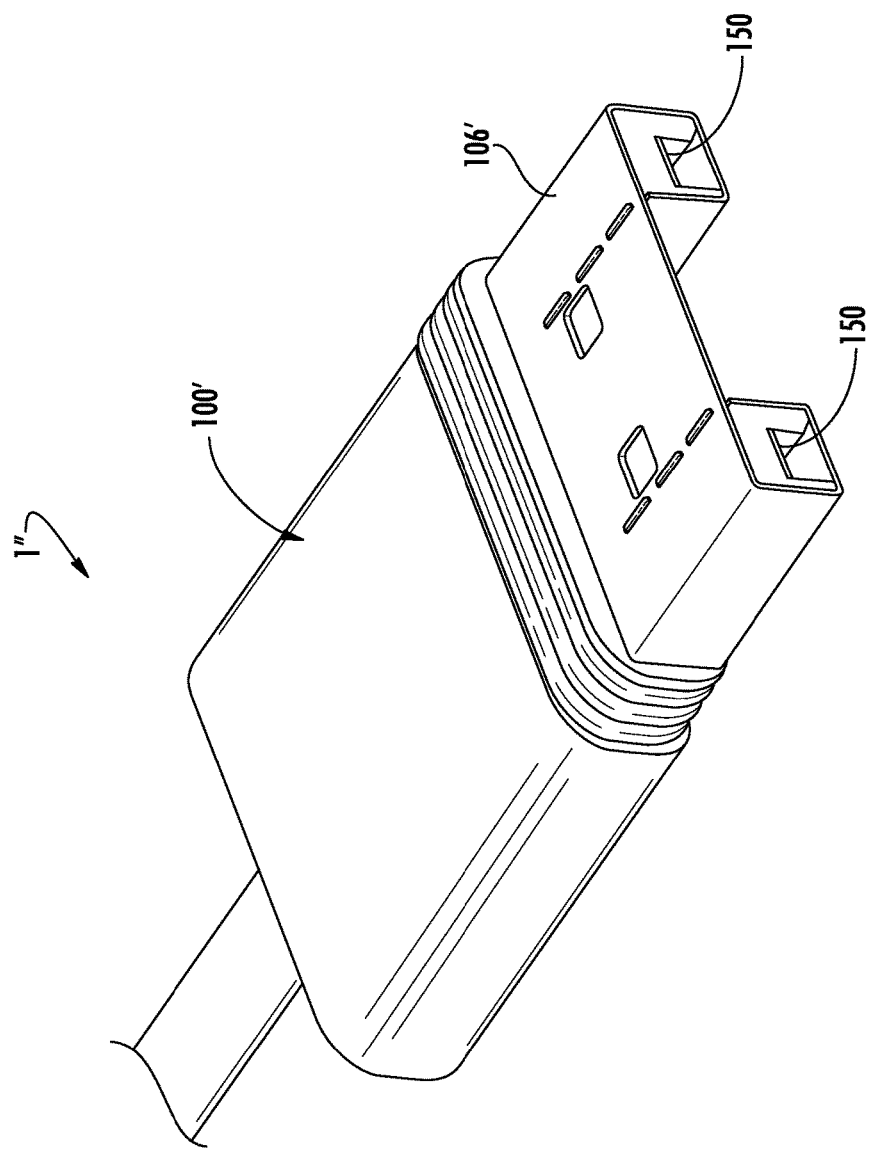
FIGS. 19 and 20 are respective top and bottom perspective views of a cable assembly having another explanatory optical plug connector with a removable nosepiece.
Figure 20:
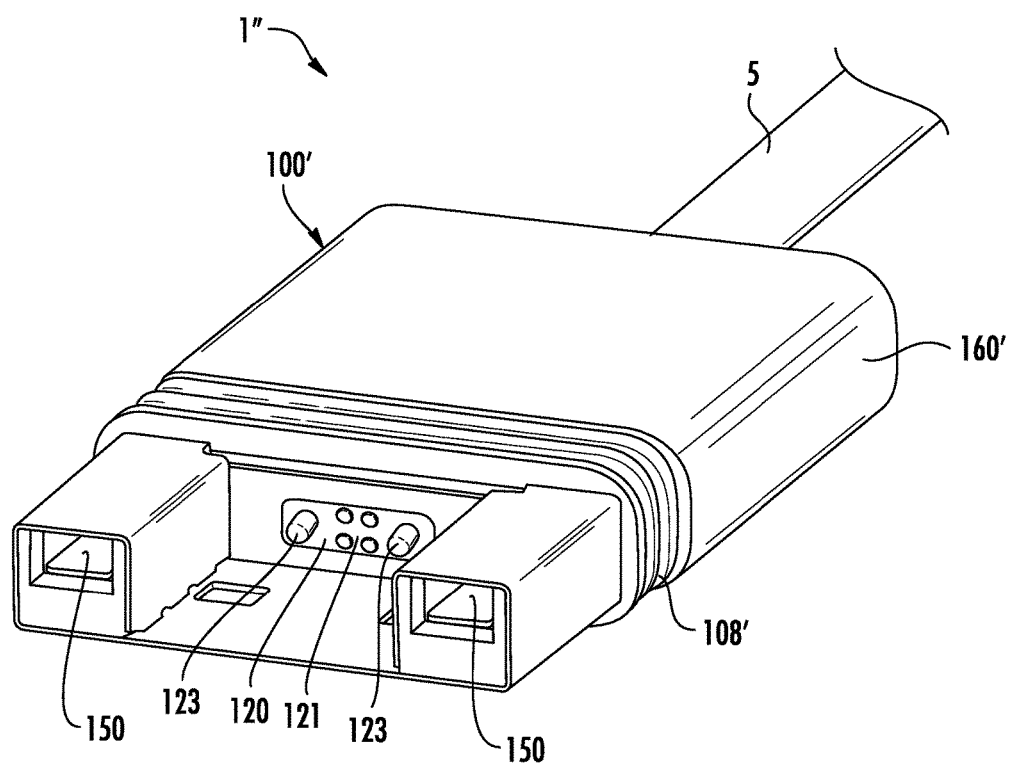
Figure 21:
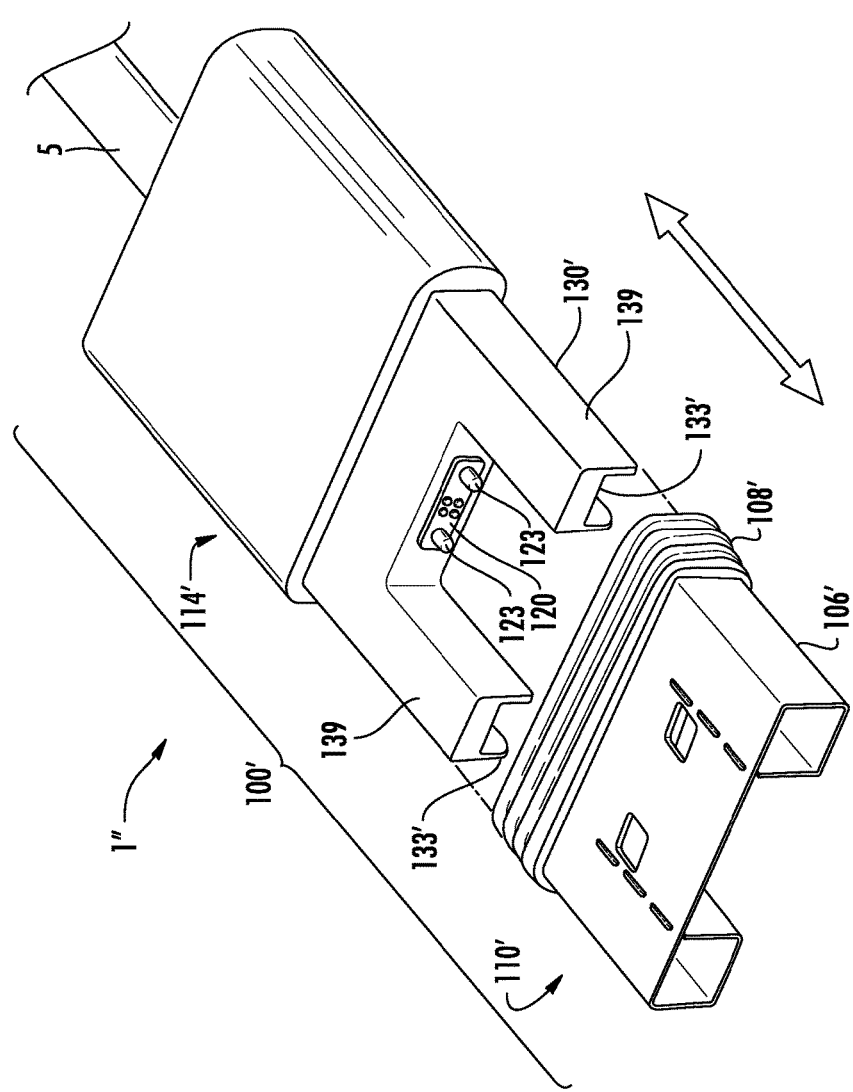
FIG. 21 is a top front perspective views of the optical plug connector of the cable assembly of FIGS. 19 and 20 having the nosepiece removed from the optical portion of the optical plug connector for providing access to the optical interface.
Figure 22:
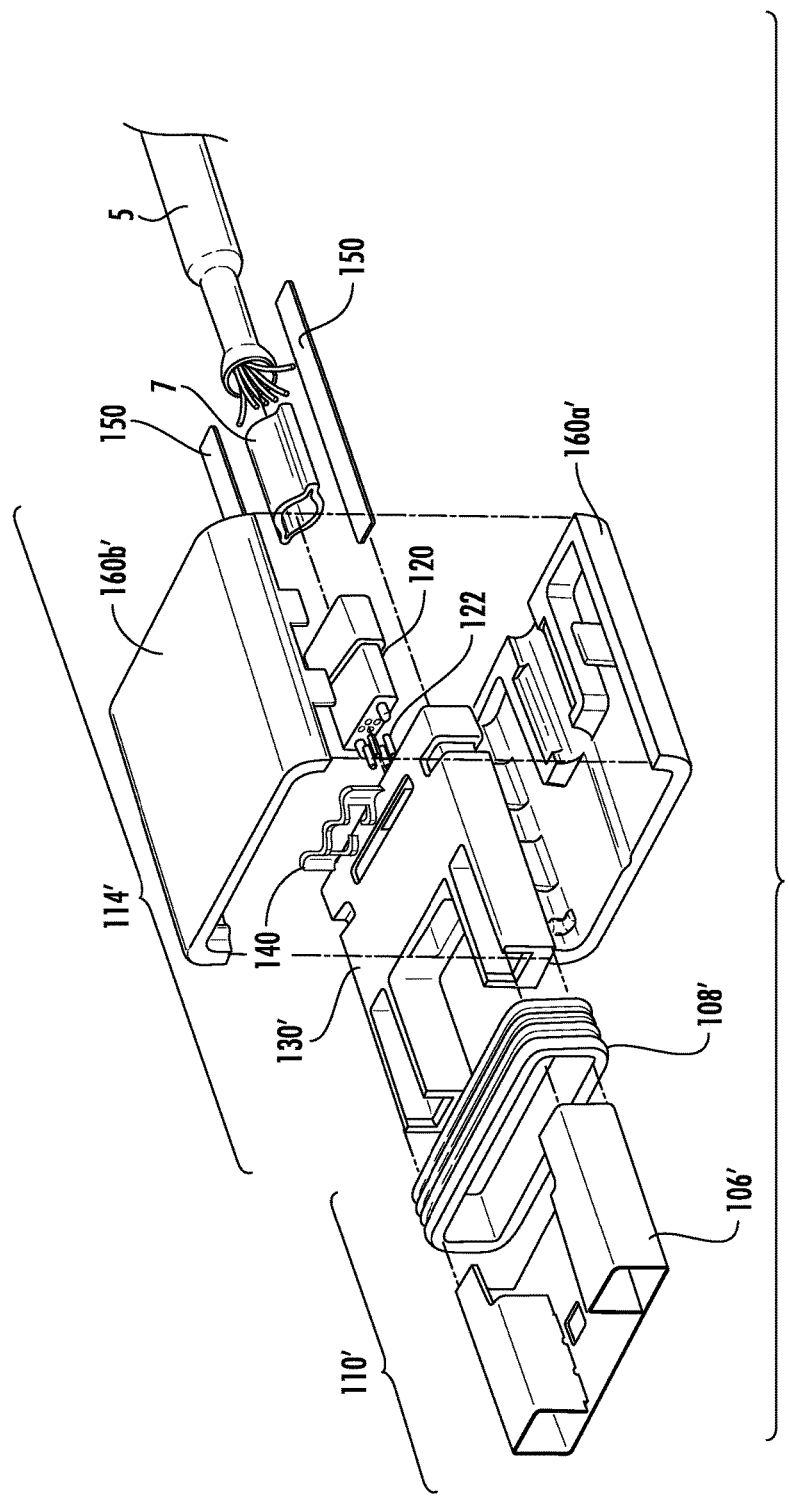
FIG. 22 is an exploded bottom view of the optical plug connector of FIGS. 19-21 showing the nosepiece and optical portion.

Other variations of the plug and/or receptacle are possible according to the concepts disclosed. By way of example, FIGS. 19-22 depicted another cable assembly 1″ having another plug 100' with a nosepiece 110'. Plug 100' is similar to plug 100 having nosepiece 110 as shown in FIGS. 19 and 20, except that the plug 100' has a simplified nosepiece 110' that does not include electrical contacts in the nosepiece. Instead, the electrical contacts 150 are extended from the optical portion 114' of plug 100' into the nosepiece 110'. As best shown in FIG. 21, inner body 130' of plug 100' has a slightly different construction than inner body 130 of plug 100. Specifically, inner body 130' has one or more longer surfaces 133' that extend outward on one or more rails 139 of inner body 130' compared with surfaces 133 of inner body 130 that are shorter. Simply stated, rails 139 and associated optical portion electrical contacts 150 extend to the front end and are received in nosepiece 110' when installed on the optical portion 114'. Consequently, nosepiece 110' is simplified and has fewer parts. Even though rails 139 extend outward on the outboard sides of the inner body 130 of plug 100' access is still provided to the optical interface when the nosepiece 110' is removed. FIG. 22 is an exploded view of plug 100' showing the various components. Although, nosepiece 110' is shown with a shell 106' and a grip 108', the grip may be omitted and the nosepiece may just be the shell.

Still other designs for the plug or receptacle are possible according to the concepts disclosed. By way of example, FIGS. 23-39 are other various views of yet another explanatory plug 300 and a receptacle 400 or components thereof according to the concepts disclosed. Generally speaking, plug 300 and complimentary receptacle 400 are similar to the plug 100 and receptacle 200 and differences and distinctions of plug 300 and receptacle 400 will be discussed as appropriate.

Figure 23:
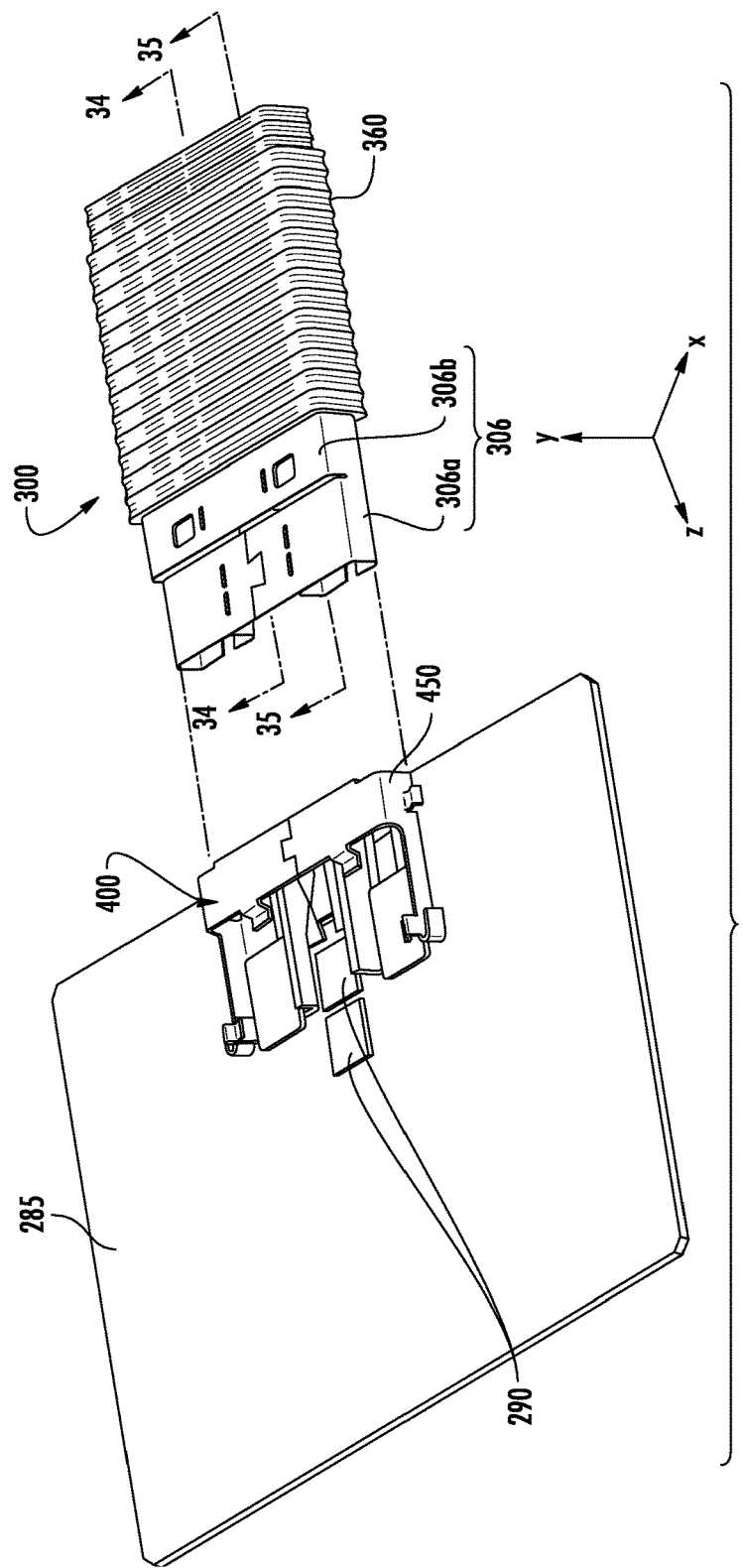
FIGS. 23 and 24 are respective top and bottom perspective views of yet another explanatory optical plug connector with a removable nosepiece and a complimentary receptacle attached to a circuit board of an electronic device in an unmated condition according to the concepts disclosed herein.
Figure 24:
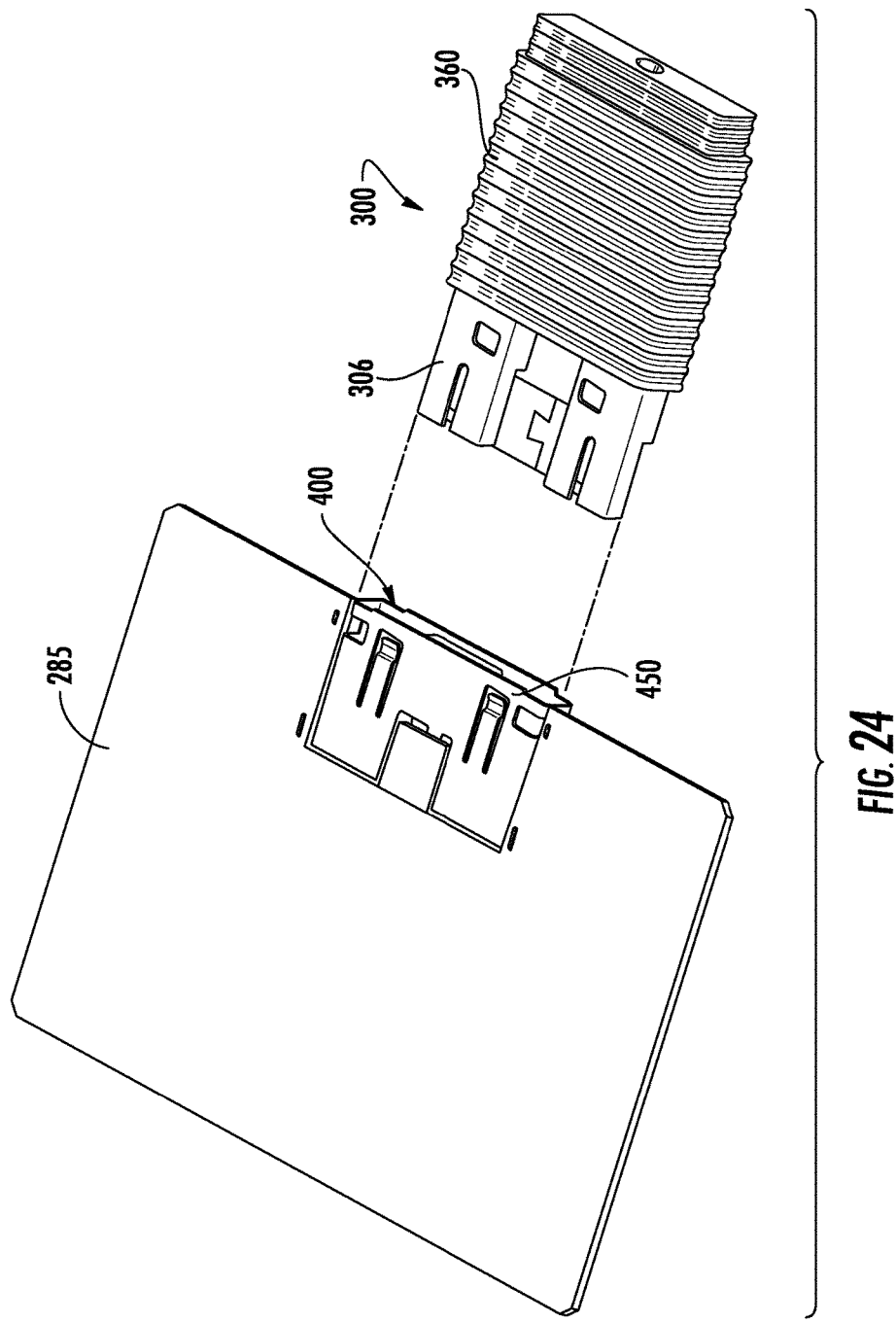
Figure 25:
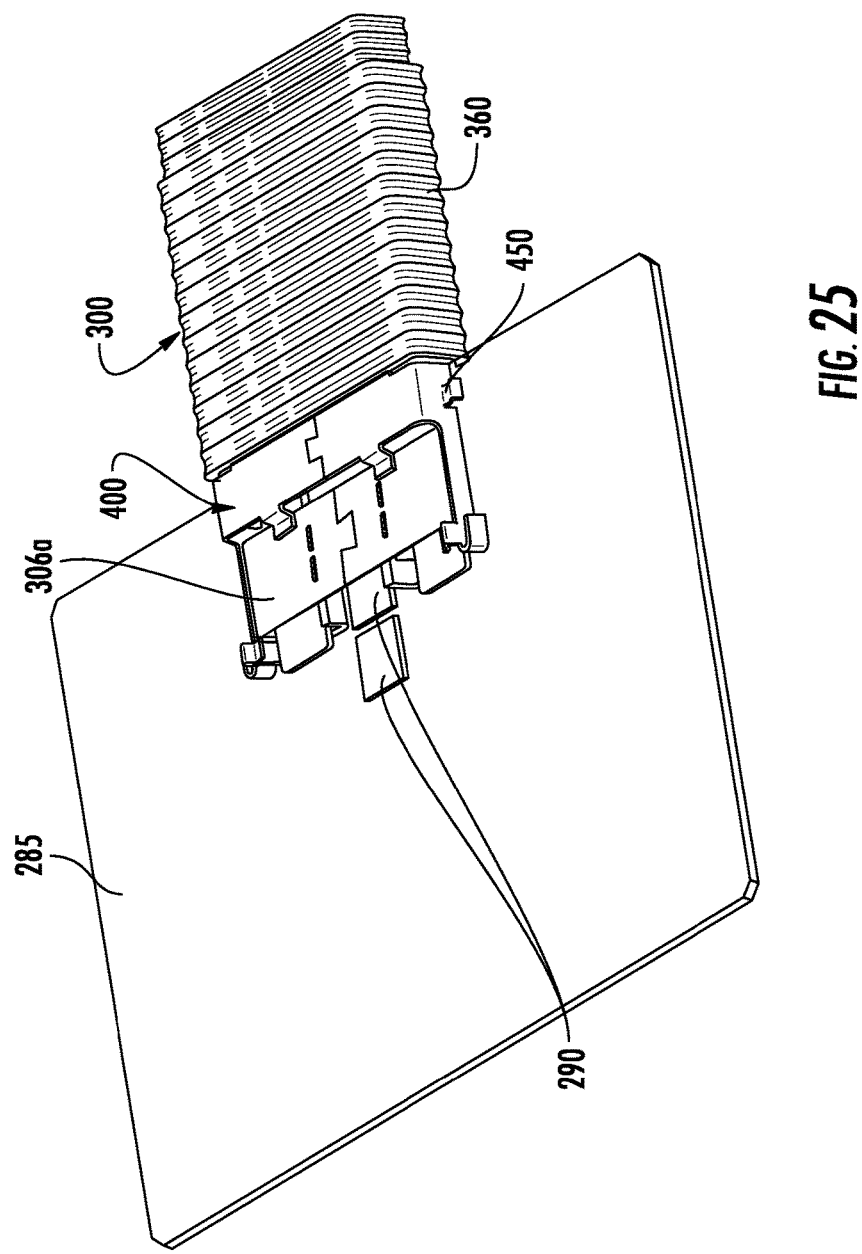
FIGS. 25 and 26 are respective top and bottom perspective views of the optical plug connector and the complimentary receptacle of FIGS. 23 and 24 in a mated condition.
Figure 26:
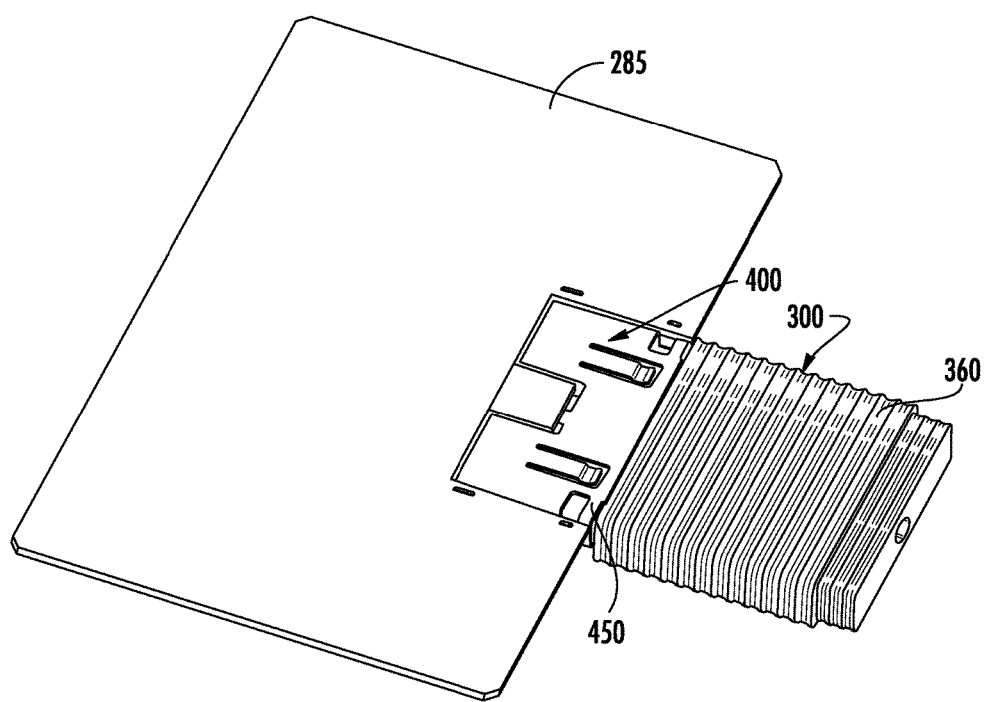
Figure 27:
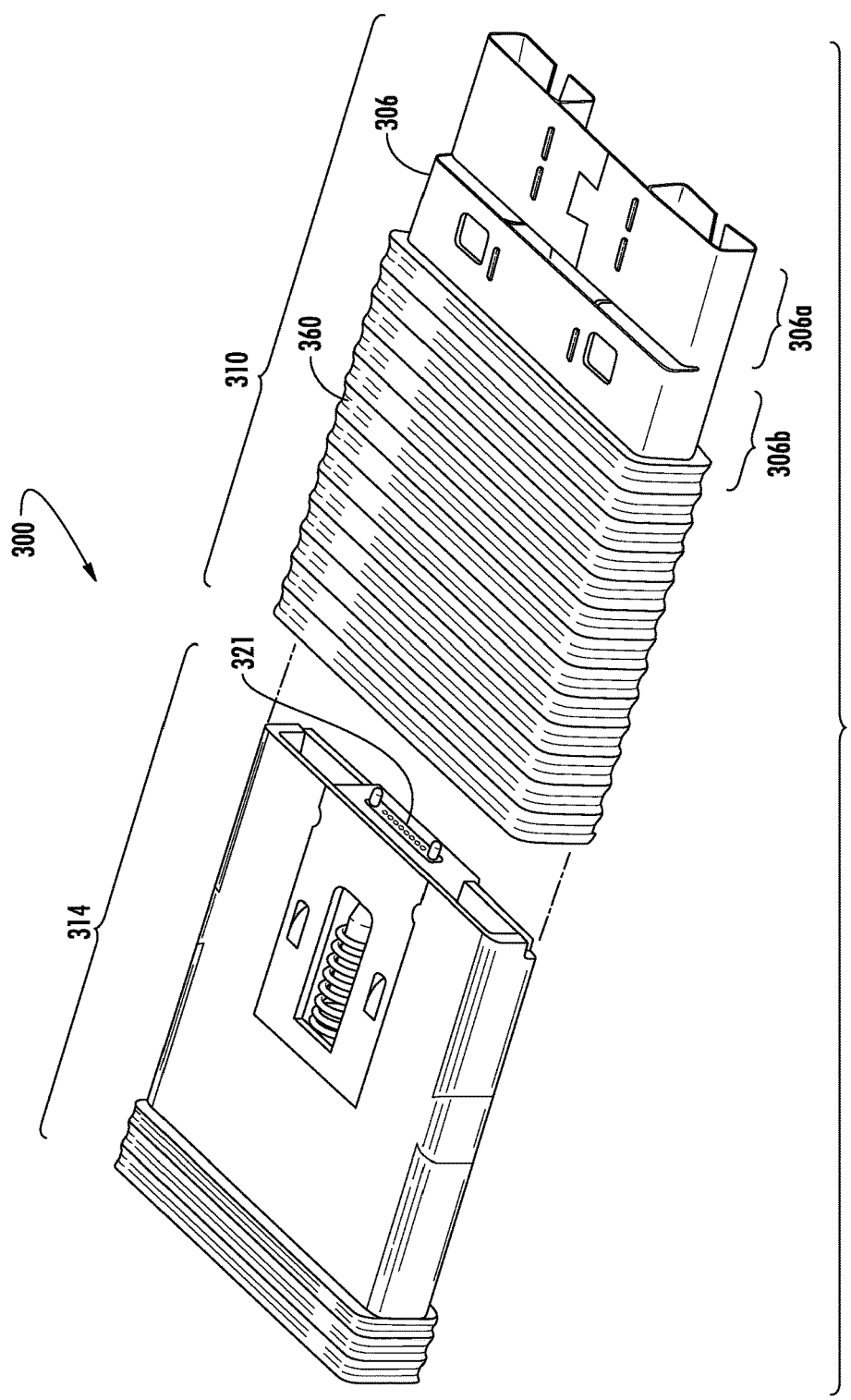
FIGS. 27 and 28 are respective top and bottom front perspective views of the optical plug connector of FIGS. 23-26 having the nosepiece removed from the optical portion of the optical plug connector for providing access to the optical interface.
Figure 28:
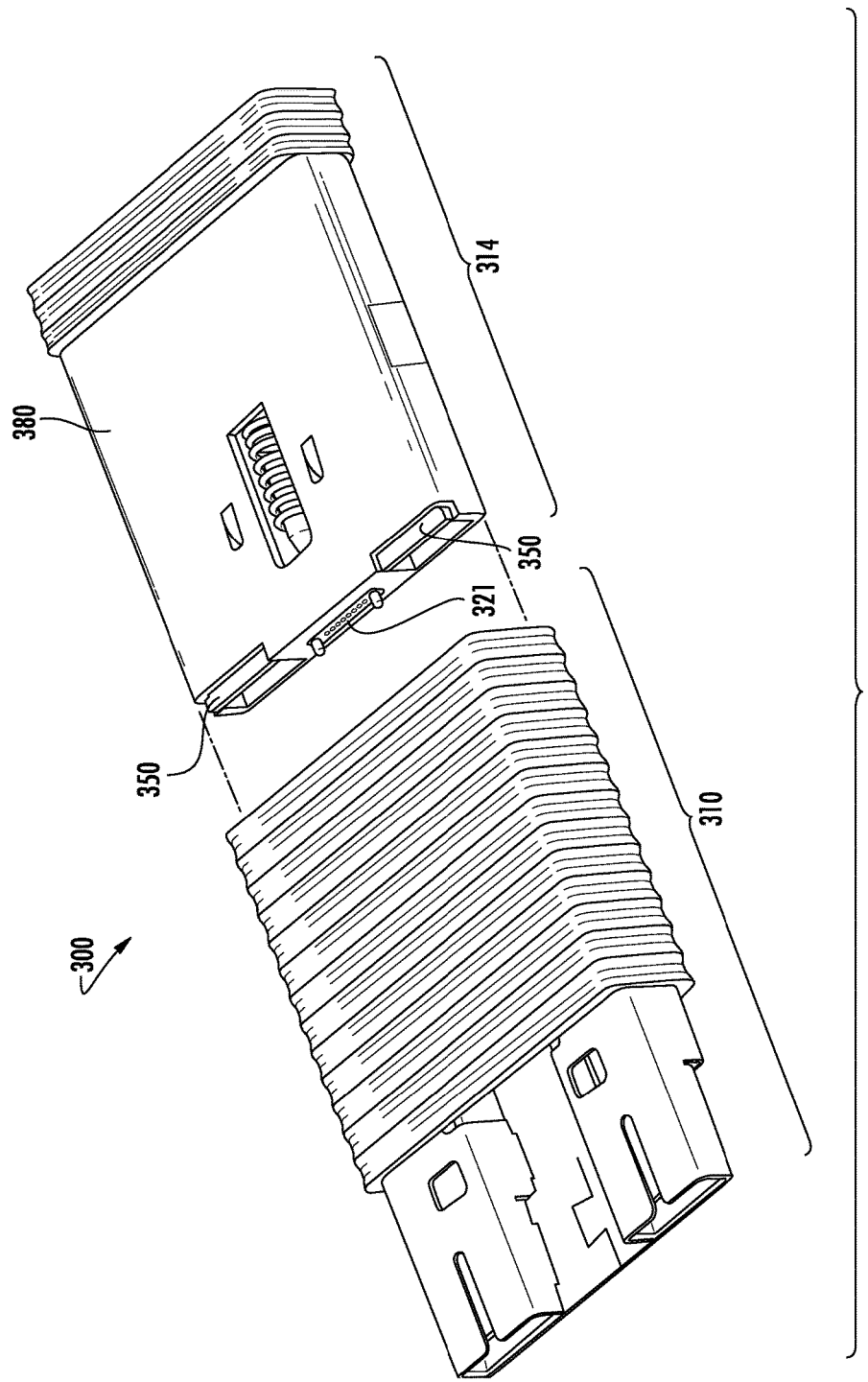

FIGS. 23 and 24 are respective top and bottom perspective views of plug 300 having a removable nosepiece and a complimentary receptacle 400 suitable for attach to circuit board 285 of an electronic device in an unmated state. FIGS. 25 and 26 are respective top and bottom perspective views of the plug 300 and receptacle 400 in a mated condition. As depicted in FIGS. 27 and 28, plug 300 has a nosepiece 310 that fits about part of an optical portion 314 and is removable and replaceable from the optical portion 314 of the plug 300. Consequently, nosepiece 310 may be removed so that the user may have access to inspect, wipe and/or clean the optical interface 321 of the plug 300 as desired. Plug 300 may be attached to a suitable cable thereby forming cable assembly as discussed herein. In this embodiment, a shell 306 of plug 300 extends beyond a housing 360 for insertion into receptacle 400 and has a stepped profile with two different heights.

Specifically, shell 306 has a front portion 306a with a first height in the y-direction and a rear portion 306b with a second height in the y-direction, where the second height of the rear portion 306b is greater than the first height of the front portion 306a. On the receptacle 400, the shell 450 only has annular construction at a forward portion as shown in FIG. 23. When the plug 300 and receptacle 400 are mated, the front portion 306a of shell 306 extends into the receptacle 400 and past the annular construction at the forward portion of shell 450 and the rear portion 306b of shell extending from the housing 360 of plug 300 is seated in the annular construction at the forward portion of shell 450 as best shown in FIG. 25. Consequently, the front portion 306a of plug 300 inside the receptacle does not require as much headroom inside the electronic device since the profile is stepped down and the rear portion 306b snuggly fits and fills the annular construction at the forward portion of shell 450 for providing a solid fit and mechanical retention. Additionally, the stepped profile of the shell 306 provides a simple orientation feature for the user to orient the plug 300 relative to the receptacle 400 during mating.

Figure 29:
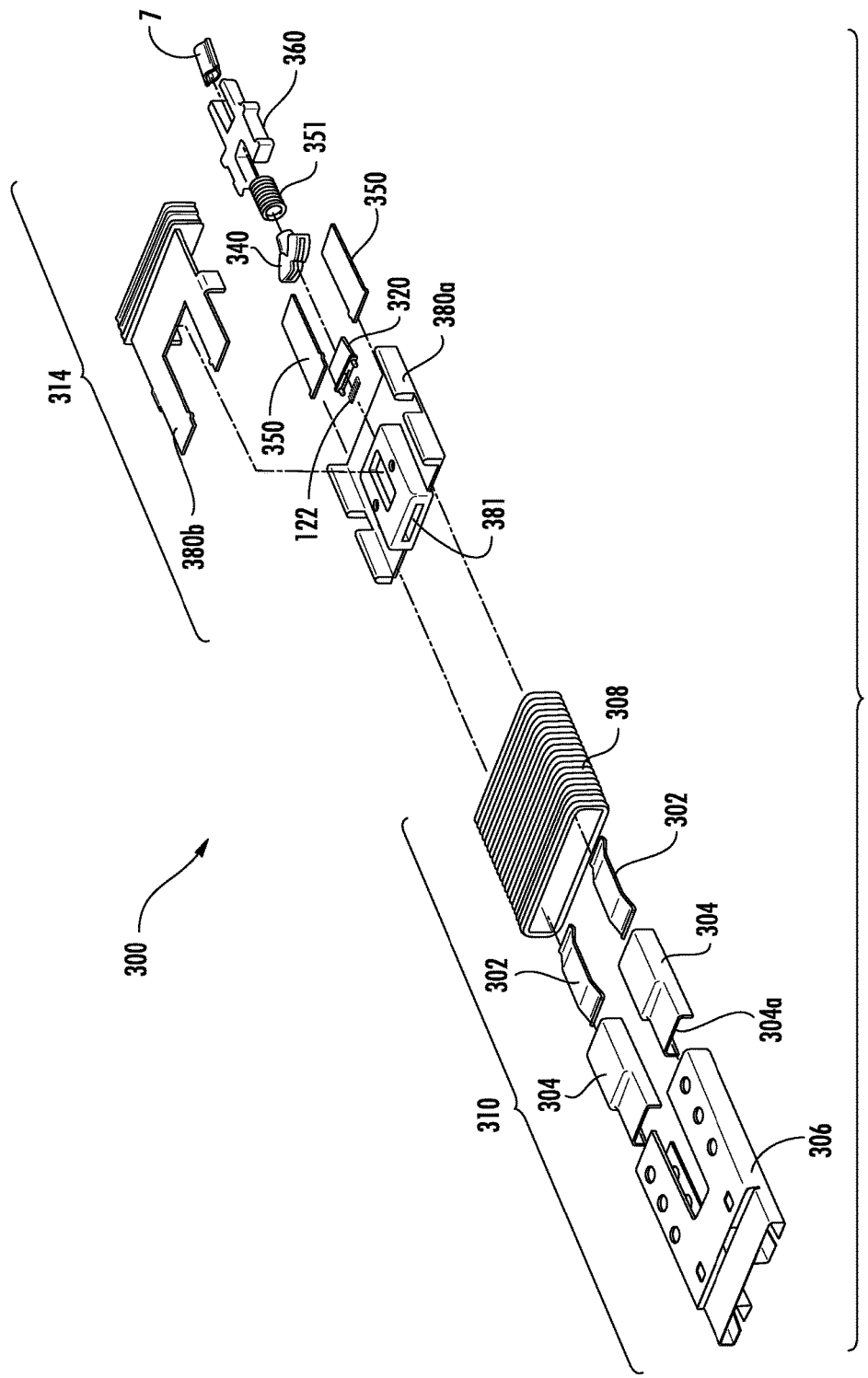
FIG. 29 is an exploded top view of the optical plug connector of FIGS. 23-28 showing the nosepiece and optical portion.

FIG. 29 is an exploded top view of the optical plug connector 300 showing the nosepiece 310 and optical portion 314. Optical portion 314 includes optical interface 121 as a portion of optical body 320, a force centering element 340, a resilient member 351, a retainer 360, one or more optical portion electrical contacts 350, and a housing 380. Optical interface 121 may have the optical fibers presented at the interface or include one or more lenses 122 presented at the interface as desired for creating the one or more optical channels of the plug 300 as discussed herein. Plug 300 has the optical channels are arranged in a linear array of eight channels, but any suitable number of channels or orientation is possible. Optical body 320 also includes one or more alignment features 123 for registering (i.e., aligning) the optical channels of the optical interface 121 of plug 300 with the complimentary optical channels of receptacle 400. In this embodiment, alignment features 123 are guide pins that are integrally formed (i.e., molded) with optical body 320 and cooperate with alignment features 223 of receptacle 400 when mated together. The alignment features 123 may have other configurations such as being non-round or discrete components as desired.

The one or more lenses 122 may be integrally formed in the optical interface 121 or arranged as one or more discrete lenses as desired. For instance, optical body 320 may be formed from an optically transmissive material with lenses integrally formed at the optical interface 121 with bores in optical body 320 leading to the respective lenses so that optical fibers may be received therein. Alternatively, the optical fiber bores (not visible) of optical body 320 may extend to the front side of the optical body 320 for receiving the one or more lenses 122 therein. By way of example, the discrete lenses may be configured as gradient index (GRIN) lenses that fit into the respective bores of the optical body.

Figure 30:
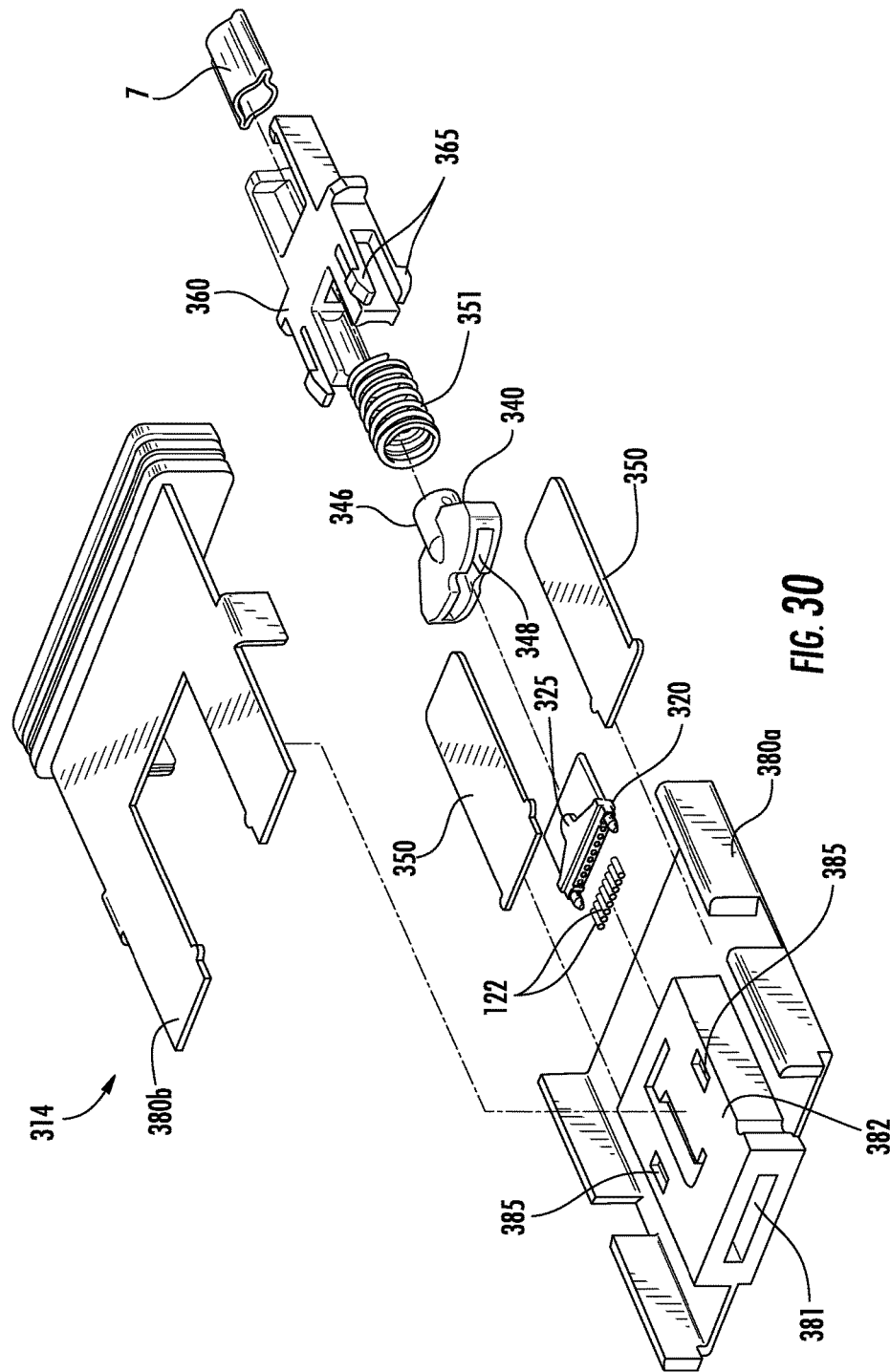
FIG. 30 is an exploded top view of the optical portion of the optical plug connector of FIG. 29.
Figure 31:
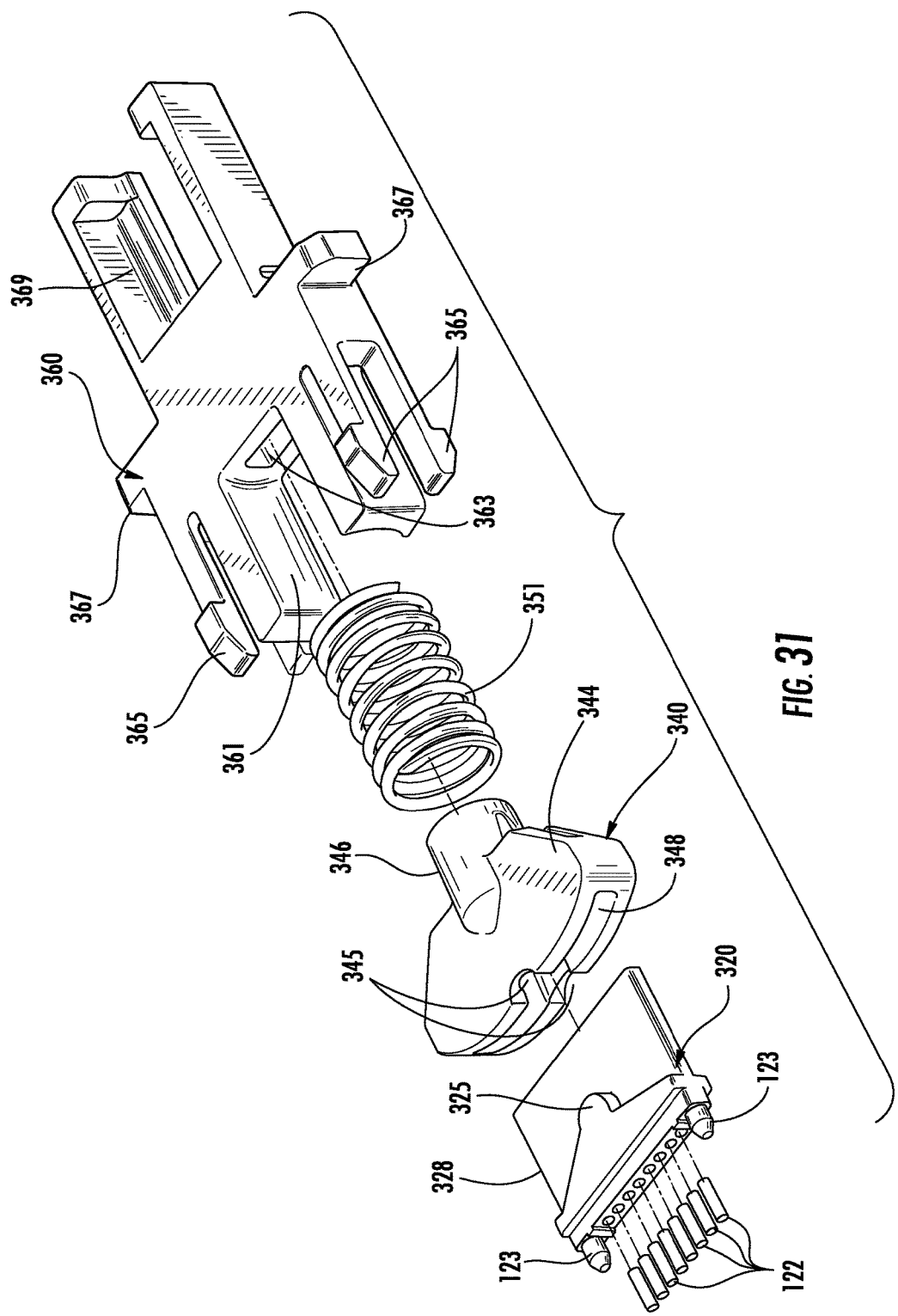
FIGS. 31 and 32 are a detailed exploded view and assembled view of part of the optical portion of the optical plug connector of FIG. 30 to show construction details.
Figure 32:
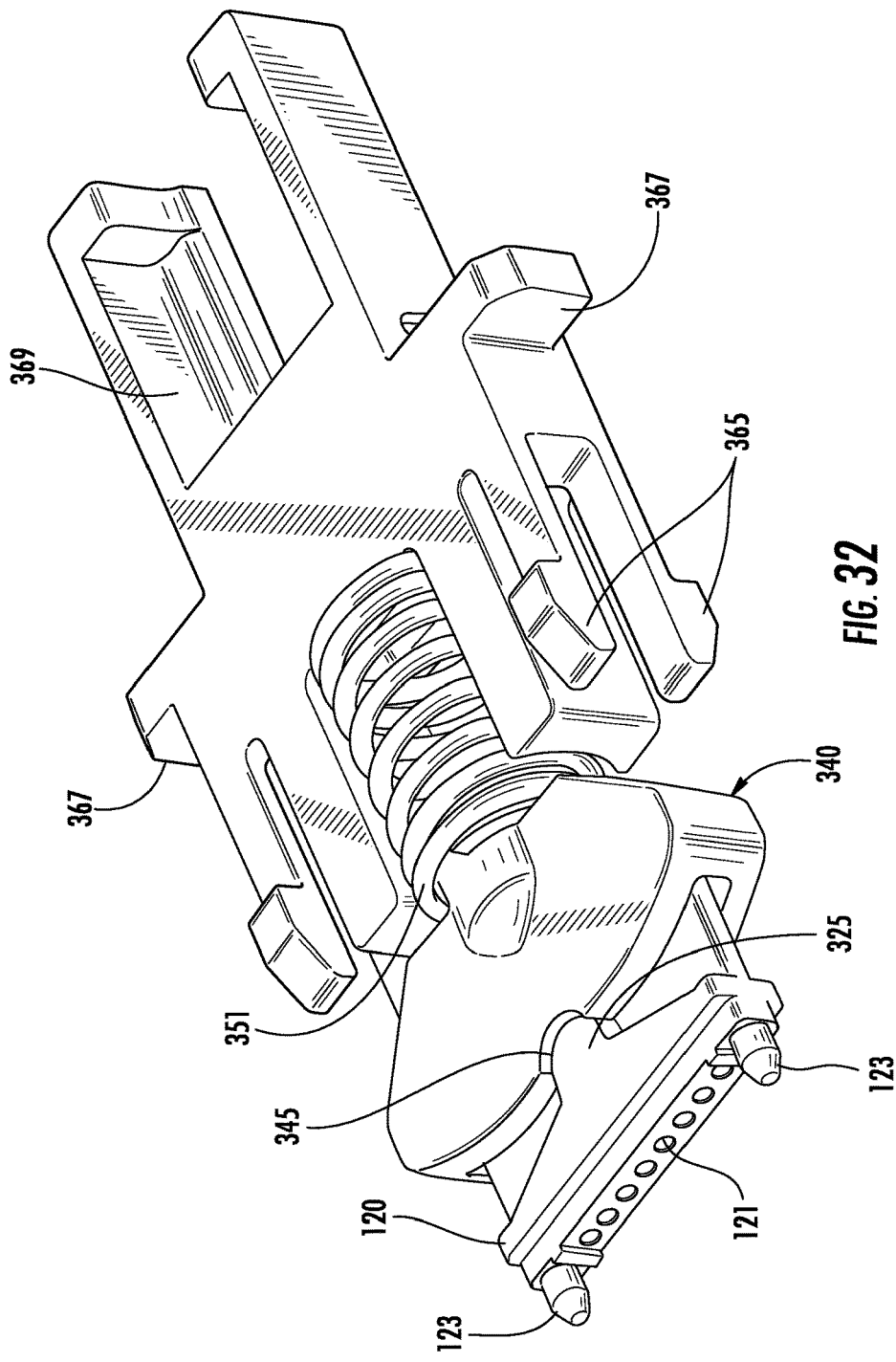

Plug 300 also has other components/constructions not used in the other embodiments for providing a force centering alignment of the optical interface 121 during mating. Illustratively, FIG. 30 is an exploded top view of the optical portion 314 of plug 100 and shows the force centering alignment structure. FIGS. 31 and 32 are a detailed exploded view and an assembled view showing the centering alignment structure removed from the optical portion 314 of plug 300.

Housing 380 of plug 300 has a different construction than the other plug housings described. Although, housing 380 includes a first portion 380a and a second portion 380b, the first portion 380a includes an inner body (not numbered) having a block-like structure having a passageway 381 that extends from a front end to a medial portion of the block-like structure and is sized for receiving a portion of optical body 320 along with force centering element 340 and resilient member 351. In other words, the inner body of this embodiment is formed as part of (i.e. integrated with) the housing to eliminate the part count. The optical interface 121 which is a portion of optical body 320 is received in the passageway 381 and extends so it is accessible at the front of housing 380. As shown, the optical body 320 may also include a flange (not numbered) that acts as a forward stop for optical body 320 when it is installed into the passageway 381. In this embodiment, optical body 320 includes a pivot point 325 and is bias forward by a resilient member 351 when assembled with force centering element 340, resilient member 351 and retainer 360 attached to the inner body (not numbered) of housing 380.

More specifically, force centering element 340 includes a passageway 348 therethrough for receiving a rear portion 328 of optical body 320 at the front end and routing the optical fibers from the cable through the rear end. The passageway 348 is sized so that rear portion 328 of optical body 340 may pivot through a desired angular range within force centering element. Force centering element 340 also includes a pivot point configured as a saddle 345 at the front end that receives and cooperates with the pivot point 325 of optical body 320 when assembled as best shown in FIG. 32. Consequently, optical body 320 may pivot within the saddle 345 during engagement with the complementary optical interface of receptacle 400. Force centering element 340 also include a barrel 346 at the rear end for seating within the resilient member 351 as shown in FIG. 32.

As best shown in FIG. 31, retainer 360 includes a front end passage 361 that leads into a pass-through 363 that connects to cradle 369 near the rear end of the retainer 360. Cradle 369 is used for receiving the crimp band 7 attached to the cable at the rear end. Front end passage 361 may receive resilient member 351 and may have a suitable shape. When assembled, the resilient member 351 is received in the front end passage 361 and the barrel 346 of force centering element 340 fits into the resilient member as shown in FIG. 32. In this embodiment, retainer 360 also includes retention features 365 for attaching/securing the force centering components within the inner body (not numbered) of the housing 360. In this embodiment, retention features 365 are configured as resilient arms that engage and attach with the housing 380. Specifically, the retention features 365 are received in complimentary retention features 385 on housing 380. More specifically, the latches (not numbered) on resilient arms of the force centering element 340 are received in retention features 385 such as the windows shown in this embodiment, but other suitable retention features are possible.

Figure 33:
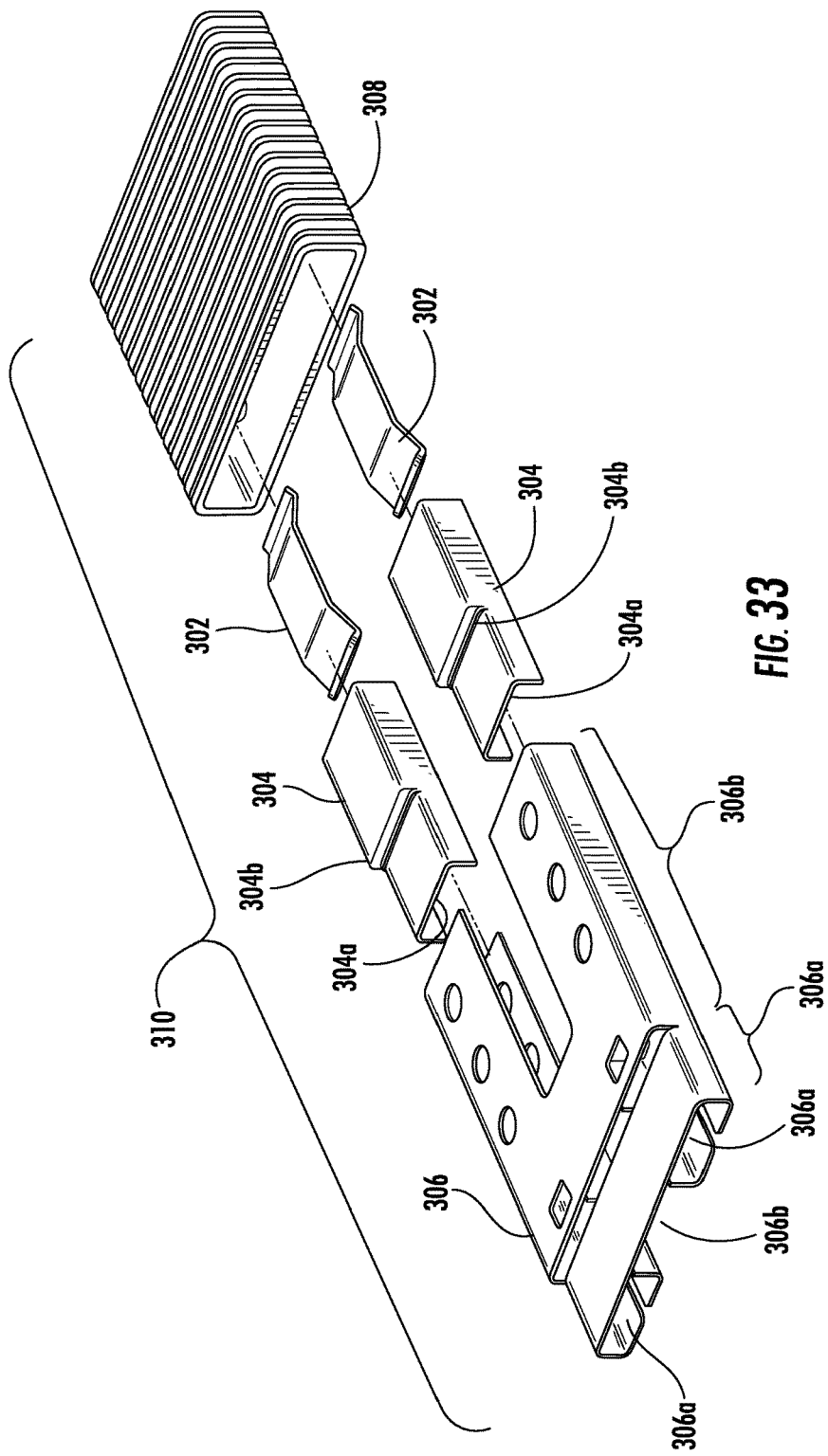
FIG. 33 is an exploded top view of the nosepiece of the optical plug connector of FIG. 29.
Figure 34:
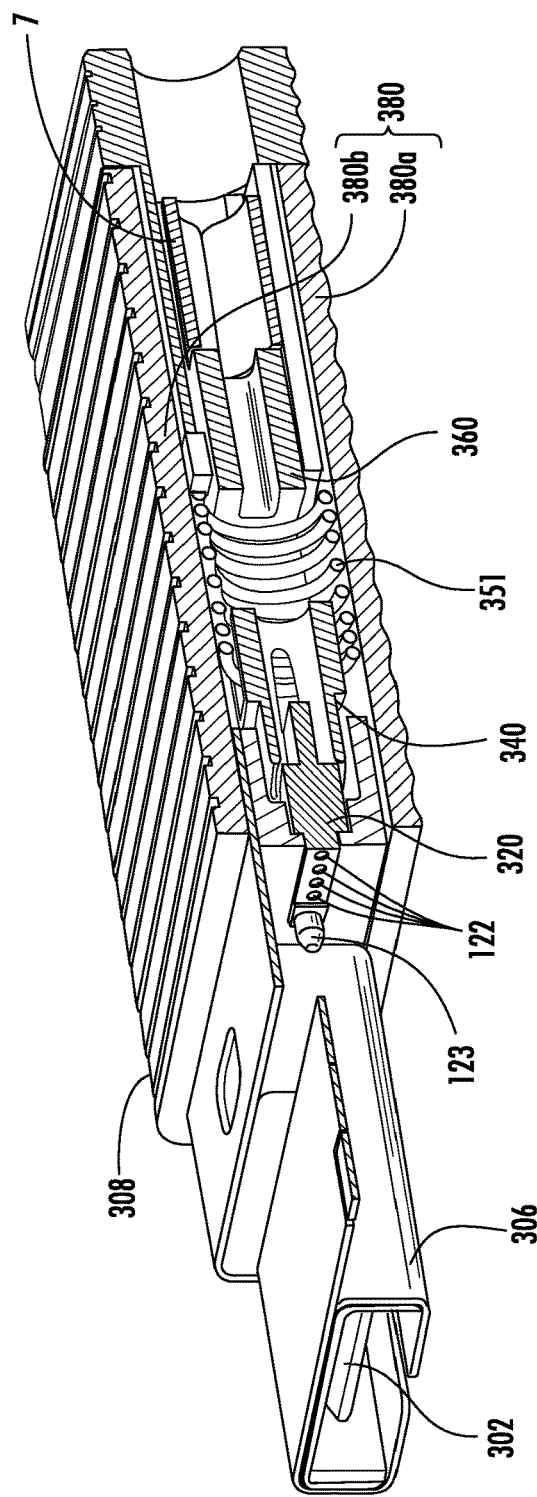
FIGS. 34 and 35 are cross-sectional views of the optical plug connector taken respectively along section lines 34-34 and 35-35 of FIGS. 23 with the nosepiece attached to the optical portion.
Figure 35:
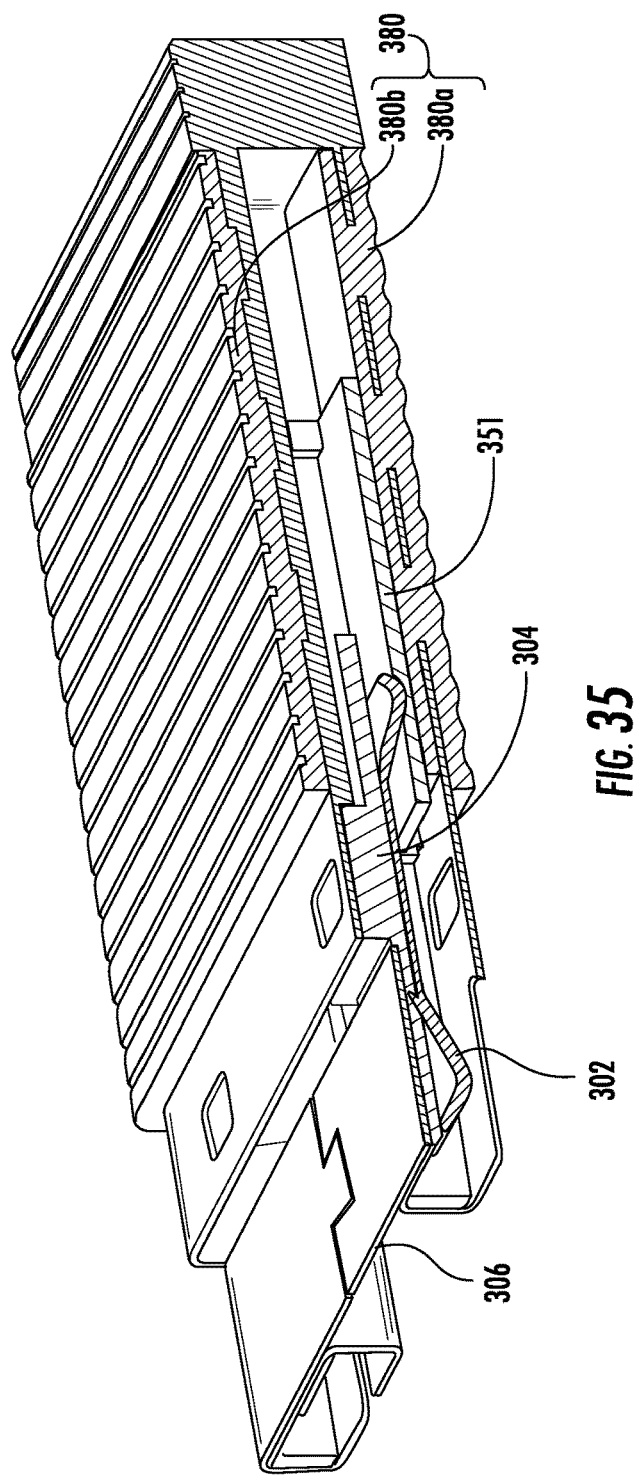
Figure 37:
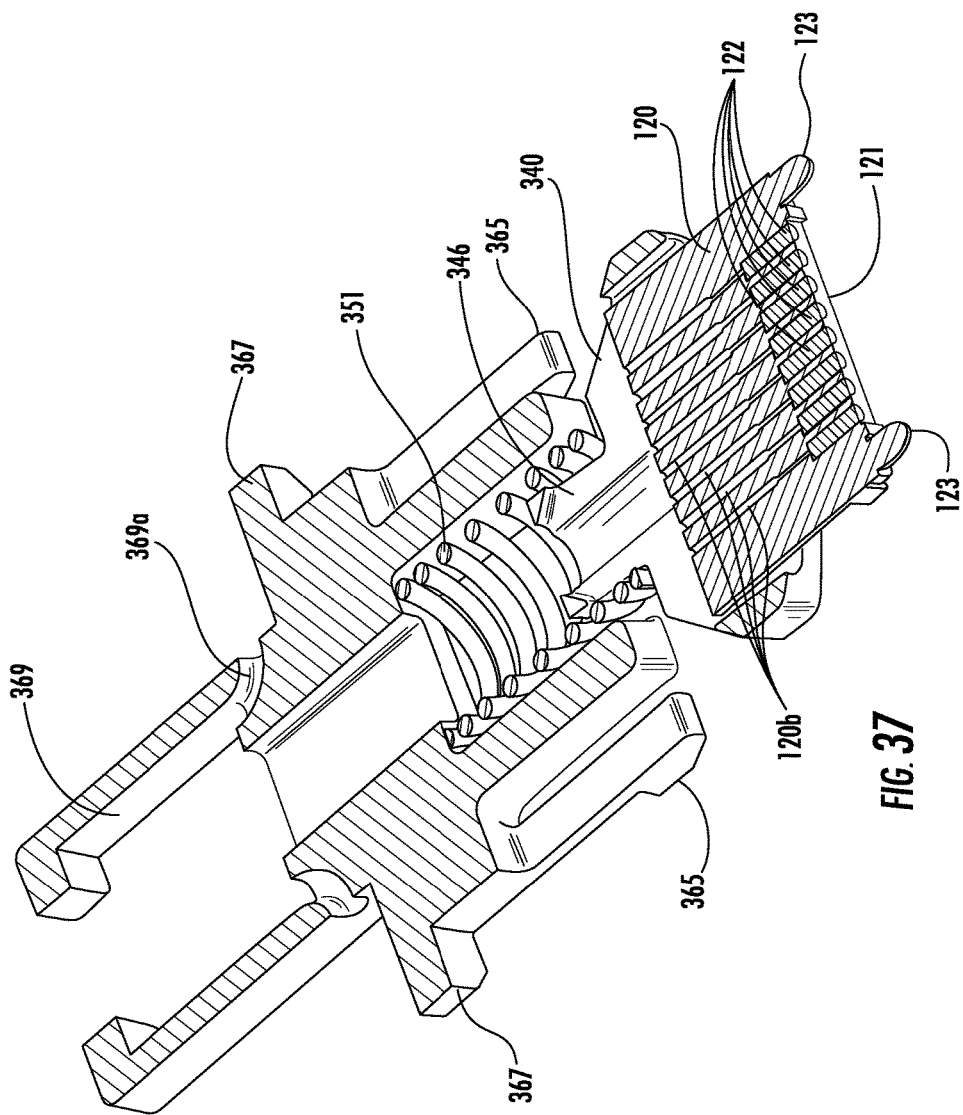
FIG. 37 is a cross-sectional view of the force centering alignment features of FIGS. 31 and 32 along with the optical interface.

FIG. 33 is an exploded top view of the nosepiece 310 of plug 300 that is similar to nosepiece 110. Nosepiece 310 is an assembly having one or more nosepiece electrical contacts 302, one or more rails 304, shell 306 and grip 308. When assembled, nosepiece electrical contacts 102 fit into respective guides 304a of the rail 304 to form a rail assembly. The rail assembly that includes the rail and the electrical contact fit into and attach to a respective lobe 306a of shell 306. In this embodiment, the rails 304 are generally flush with the front end of shell 306, but other arrangements are possible. The rail(s) 304 may be attached to the lobes 306a of shell 306 in any suitable manner. In this embodiment, the nosepiece 310 includes first and second rails 304 each having a respective nosepiece electrical contact 302 that are attached to the respective guides 304a. As shown, the rails 304 have a step-up 304b in the middle for fitting into the shell 306 having the front portion 306a and rear portion 306b. Nosepiece electrical contacts 302 are electrically connected to optical portion electrical contacts 351 when the nosepiece 310 is attached to the optical portion 314. As depicted, the lobes 306a of shell 306 are disposed on opposite sides of a pocket 306b. Pocket 306b allows the shell 306 and nosepiece 310 to fit about the inner body (i.e., the block-like feature) that houses optical body 320 having the optical interface 121 the when the nosepiece 310 is attached to the optical portion 314. FIGS. 34 and 35 are cross-sectional views of plug 100 respectively taken along section lines 34-34 and 35-35 as shown in FIG. 23. FIG. 34 depicts a cross-section near the center of the longitudinal axis and FIG. 35 depicts a cross-section near the middle of one of the lobes 306a. FIG. 37 is a cross-sectional view of the force centering alignment features of plug 300 along with the optical interface 121.

Figure 36:
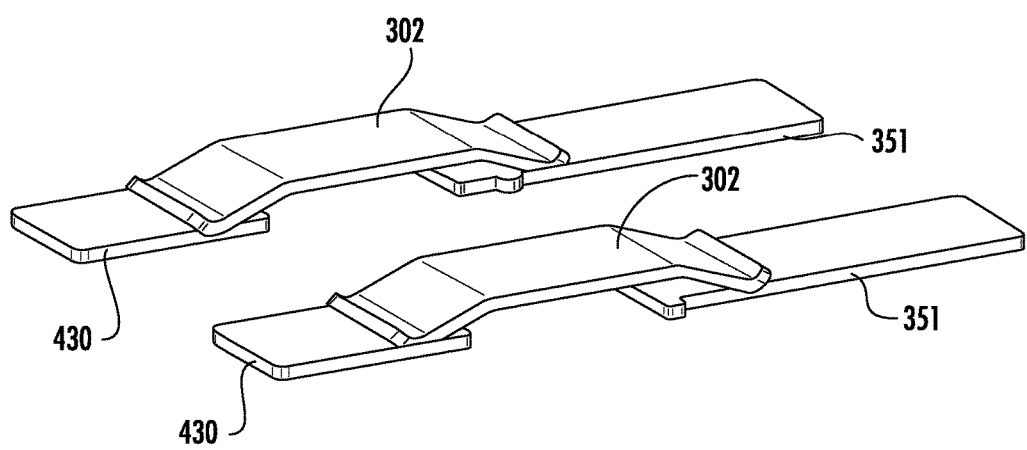
FIG. 36 is a perspective view showing the electrical contacts of the optical plug connector and receptacle in a mated state with the other components removed for clarity.

FIG. 35 shows the nosepiece electrical contacts 302 in electrical connection with the optical portion electrical contacts 351 with the nosepiece 310 attached to the optical portion 314. FIG. 36 is a perspective view showing the electrical contacts of the plug and receptacle in a mated state with the other components of the plug and receptacle removed for clarity. As shown, nosepiece electrical contacts 302 act as a bridge between the optical portion electrical contacts 351 to the electrical contacts 430 of receptacle 400.

Figure 38:
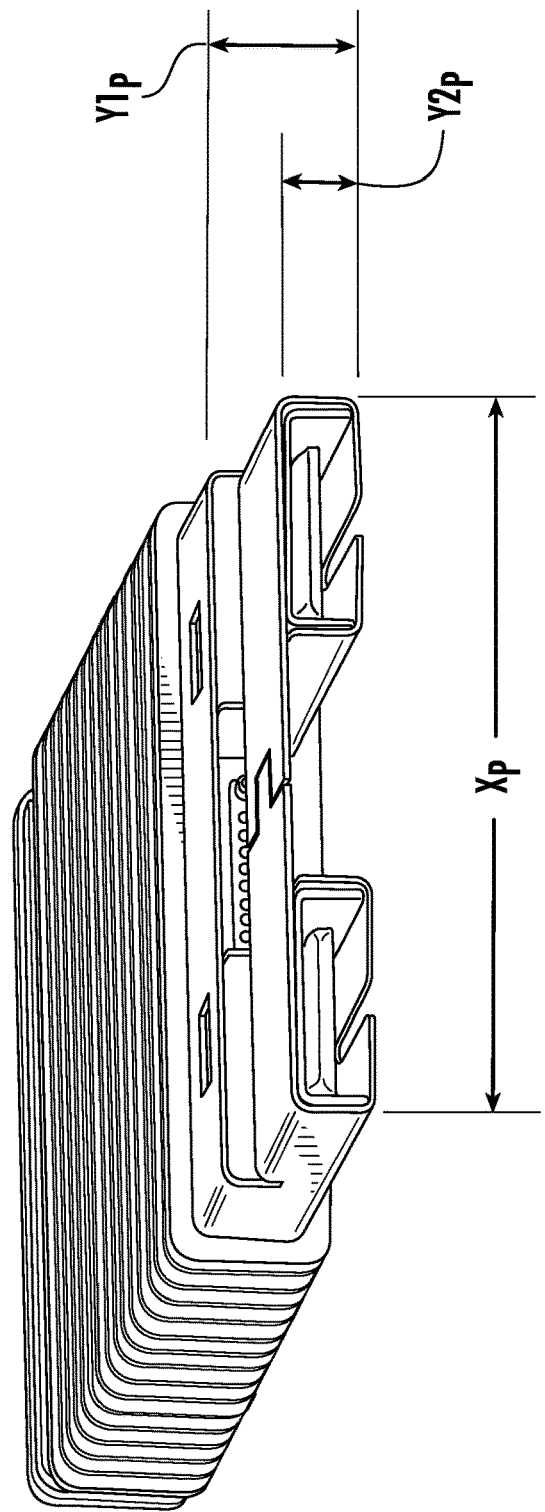
FIGS. 38-40 are various perspective views of the optical plug connector or the receptacle showing explanatory dimensions.
Figure 39:
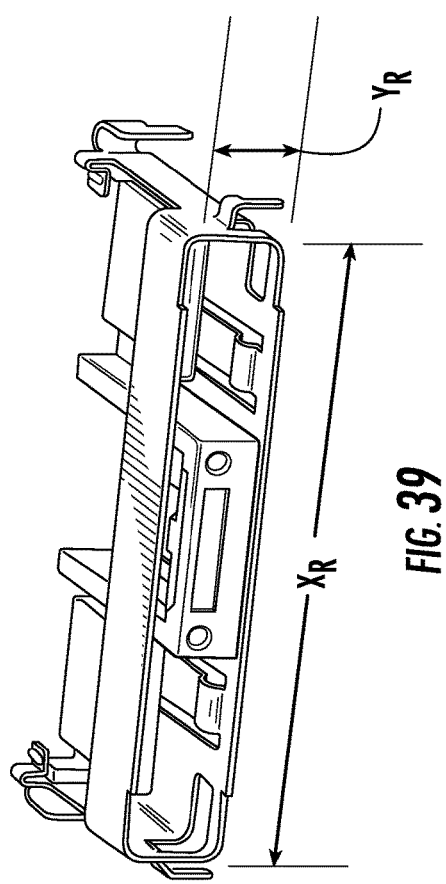
Figure 40:
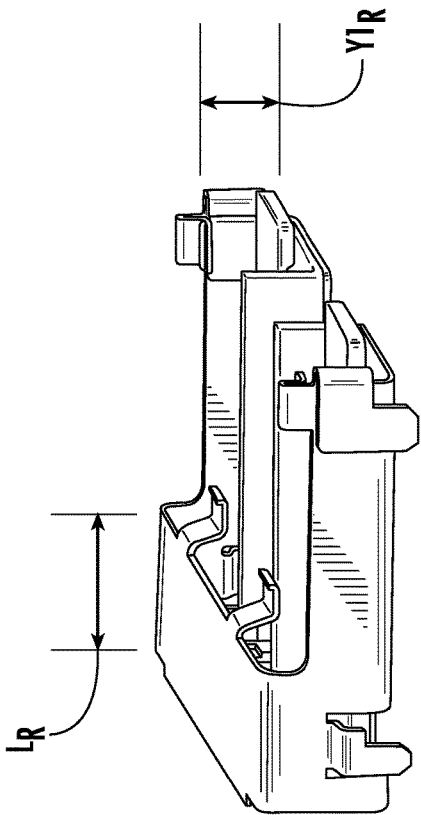

FIG. 38 is a front perspective view of plug 300 and FIGS. 39 and 40 respectively are front and side perspective views of receptacle 400 showing explanatory dimensions for the plug 300 and receptacle 400. Regarding plug 300 has a width dimension $X_p$ and a total height $Y1_p$ and a step-down height $Y2_p$. Any suitable values may be used for plug 300. By way of example and not limitation, plug 300 can have a width $X_p$ in the range of 10-50 millimeters, the total height $Y1_p$ in the range of 2-20 millimeters, and step-down height $Y2_p$ in the range of 1-15 millimeters, but other dimensions are possible. Likewise, any suitable values may be used for receptacle 400. By way of example and not limitation, receptacle 400 can have a width $X_R$ in the range of 10-50 millimeters, the total height $Y_R$ in the range of 2-20 millimeters, a length of the annular portion $L_R$ in the range of 2-10 millimeters, and step-down height $Y1_R$ in the range of 1-15 millimeters, but other dimensions are possible.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical plug connector for mating with an optical receptacle, the optical plug connector comprising:
   an optical portion having an optical interface; and
   a nosepiece that fits about part of the optical portion, the nosepiece including a first lobe, a second lobe, and a pocket, wherein the first lobe and the second lobe are disposed on opposing sides of the pocket, wherein the nosepiece is removable and replaceable from the optical portion for accessing the optical interface.

2. The optical plug connector of claim 1, the optical portion further including an inner body and a housing.

3. The optical plug connector of claim 2, wherein the inner body is formed with the housing.

4. The optical plug connector of claim 2, the optical interface being a portion of an optical body received in a passageway of the inner body.

5. The optical plug connector of claim 4, the optical body being able to move within the passageway of the inner body.

6. The optical plug connector of claim 4, the inner body having one or more slots or windows for receiving a retainer, wherein the retainer biases the optical body forward.

7. The optical plug connector of claim 1, the optical interface including one or more lenses.

8. The optical plug connector of claim 7, the one or more lenses being integrally formed in the optical interface or arranged as one or more discrete lenses.

9. The optical plug connector of claim 1, the optical plug connector further including one or more magnets.

10. The optical plug connector of claim 1, the optical portion further including one or more optical portion electrical contacts.

11. The optical plug connector of claim 10, the optical portion further including an inner body, the one or more optical portion electrical contacts being attached to the inner body.

12. The optical plug connector of claim 1, the nosepiece being an assembly.

13. The optical plug connector of claim 12, the optical portion further including one or more optical portion electrical contacts, the nosepiece including one or more nosepiece electrical contacts for being electrically connected to the one or more optical portion electrical contacts when the nosepiece is attached to the optical portion of the optical plug connector.

14. The optical plug connector of claim 12, the nosepiece including a shell and one or more rails disposed within at least one of the first lobe and the second lobe.

15. The optical plug connector of claim 1, the optical portion further including a cover.

16. The optical plug connector of claim 1 being a portion of a cable assembly.

17. An optical plug connector for mating with an optical receptacle, the optical plug connector comprising:
   an optical portion having a housing, an inner body, and an optical body having an optical interface, the inner body having a passageway for receiving the optical body, the housing including one or more recesses on an exterior of the housing; and
   a nosepiece that fits about part of the optical portion, the nosepiece including a grip having one or more extensions that are received within the one or more recesses of the exterior of the housing of the optical portion, wherein the nosepiece is removable and replaceable from the optical portion for accessing the optical interface.

18. The optical plug connector of claim 17, further including a force centering element having a pivot point.

19. The optical plug connector of claim 17, the optical body being able to move within the passageway of the inner body.

20. The optical plug connector of claim 17, the inner body having one or more slots or windows for receiving a retainer, wherein the retainer biases the optical body forward.

21. The optical plug connector of claim 17, the optical interface including one or more lenses.

22. The optical plug connector of claim 21, the one or more lenses being integrally formed in the optical interface or arranged as one or more discrete lenses.

23. The optical plug connector of claim 17, the optical plug connector further including one or more magnets.

24. The optical plug connector of claim 17, the optical portion further including one or more optical portion electrical contacts.

25. The optical plug connector of claim 24, the one or more optical portion electrical contacts being attached to the inner body.

26. The optical plug connector of claim 17, the nosepiece being an assembly.

27. The optical plug connector of claim 26, the optical portion further including one or more optical portion electrical contacts, the nosepiece further including one or more nosepiece electrical contacts for being electrically connected to the one or more optical portion electrical contacts when the nosepiece is attached to the optical portion of the optical plug connector.

28. The optical plug connector of claim 26, the nosepiece including a shell and one or more rails within the shell.

29. The optical plug connector of claim 17, the optical portion further including a cover.

30. The optical plug connector of claim 17 being a portion of a cable assembly.

31. The optical plug connector of claim 1, the optical portion further including a housing, the housing including one or more recesses on an exterior of the housing, the nosepiece further including a grip having one or more extensions that are received within the one or more recesses of the exterior of the housing of the optical portion.

32. The optical plug connector of claim 17, the nosepiece including a first lobe, a second lobe, and a pocket, wherein the first lobe and the second lobe are disposed on opposing sides of the pocket.

33. The optical plug connector of claim 17, wherein the nosepiece covers part of the inner body when the nosepiece fits about the optical body.

34. An optical plug connector, comprising:
an optical portion having an inner body, one or more optical portion electrical contacts, and an optical body having an optical interface, the inner body having a passageway for receiving the optical body and one or more surfaces disposed outward of the passageway for supporting the one or more optical portion electrical contacts; and
a nosepiece that fits about part of the optical portion, the nosepiece including one or more nosepiece electrical contacts for being electrically connected to the one or more optical portion electrical contacts when the nosepiece is attached to the optical portion, wherein the nosepiece is removable and replaceable from the optical portion for accessing the optical interface.

35. The optical plug connector of claim 34, the nosepiece including one or more lobes.

36. The optical plug connector of claim 35, the one or more nosepiece electrical contacts being disposed within the one or more lobes.

37. The optical plug connector of claim 36, the nosepiece further including one or more rails disposed within the one or more lobes, each of the one or more rails having a guide for receiving the one or more nosepiece electrical contacts.

* * * * *